(12) United States Patent
Ko et al.

(10) Patent No.: US 11,828,615 B2
(45) Date of Patent: Nov. 28, 2023

(54) AR PROCESSING DEVICE, AUGMENTED REALITY-BASED ROUTE GUIDANCE METHOD AND ELECTRONIC DEVICE

(71) Applicant: THINKWARE CORPORATION, Seongnam-si (KR)

(72) Inventors: Suk Pil Ko, Seongnam-si (KR); Shin Hyoung Kim, Seongnam-si (KR); Yo Sep Park, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 47 days.

(21) Appl. No.: 17/394,729

(22) Filed: Aug. 5, 2021

(65) Prior Publication Data
US 2022/0042813 A1 Feb. 10, 2022

(30) Foreign Application Priority Data

Aug. 6, 2020 (KR) .................. 10-2020-0098828
Aug. 6, 2020 (KR) .................. 10-2020-0098847
Jul. 30, 2021 (KR) .................. 10-2021-0100694

(51) Int. Cl.
*G01C 21/36* (2006.01)
*G06K 9/00* (2022.01)
*G06V 20/56* (2022.01)

(52) U.S. Cl.
CPC ....... *G01C 21/365* (2013.01); *G01C 21/3602* (2013.01); *G01C 21/3632* (2013.01); *G01C 21/3647* (2013.01); *G01C 21/3658* (2013.01); *G06V 20/588* (2022.01)

(58) Field of Classification Search
None
See application file for complete search history.

(56) References Cited

U.S. PATENT DOCUMENTS

| 2017/0293813 A1* | 10/2017 | Belhoula | G01C 21/3658 |
| 2019/0283776 A1* | 9/2019 | Lübcke | B60R 1/00 |
| 2019/0384304 A1* | 12/2019 | Towal | G06V 20/56 |
| 2022/0172652 A1* | 6/2022 | Yagyu | G08G 1/16 |

FOREIGN PATENT DOCUMENTS

JP 2018125629 A * 8/2018

OTHER PUBLICATIONS

Machine translation of JP-2018125629-A (Year: 2018).*

* cited by examiner

*Primary Examiner* — Anne Marie Antonucci
*Assistant Examiner* — Kyle S Park
(74) *Attorney, Agent, or Firm* — WHDA, LLP

(57) ABSTRACT

An augmented reality (AR)-based route guidance method includes acquiring a driving image captured by an image capturing device of a vehicle which is running, acquiring route data to a destination of the vehicle, recognizing both side lane markings of a lane in which the vehicle is running from the acquired driving image, generating first route guidance linear data based on the recognized both side lane markings for a region in which both side lane markings are recognized in the driving image, generating second route guidance linear data using link linear data of the route data for a region in which both side lane markings are not recognized in the driving image, combining the first route guidance linear data and the second route guidance linear data to generate combined route guidance linear data, and displaying a route guidance object in AR using the generated combined route guidance linear data.

19 Claims, 21 Drawing Sheets

$$s\begin{bmatrix}x\\y\\1\end{bmatrix} = \begin{bmatrix}f_x & skew\_cf_x & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}$$

603   602                            601           605

AR PROCESSING DEVICE, AUGMENTED REALITY-BASED ROUTE GUIDANCE METHOD AND ELECTRONIC DEVICE

CROSS-REFERENCE TO RELATED APPLICATION

This application claims the priority and benefit of Korean Patent Application No. 10-2020-0098828 filed on Aug. 6, 2020, Korean Patent Application No. 10-2020-0098847 filed on Aug. 6, 2020 and Korean Patent Application No. 10-2021-0100694 filed on Jul. 30, 2021 with the Korean Intellectual Property Office, the disclosure of which is incorporated herein by reference.

BACKGROUND OF THE INVENTION

1. Field of the Invention

The present invention relates to a technology for displaying various AR objects related to a vehicle driving through AR.

2. Description of the Related Art

Augmented reality (AR) refers to a technology for synthesizing virtual objects or information in the real world to make them look like objects existing in a real environment.

Unlike virtual reality (VR) which synthesizes and displays virtual objects in the virtual world, AR synthesizes virtual objects in the real world, so additional information that is difficult to obtain only in the real world may be provided to users.

Because of these characteristics, AR has been applied to various fields.

An example is an AR navigation that performs vehicle driving-related guidance based on AR. Such AR navigation enhances user convenience by visually superimposing additional information on a screen that projects the real world users actually see. Examples of the additional information described above include a point of interest (POI), a graphic element indicating a route to a destination, and the like.

However, the AR navigation of a related art is disadvantageous in that it is vulnerable to displaying information at a distance from a vehicle and displaying information in a high-speed driving environment due to the limitations of a camera environment.

Due to these disadvantages, a shape and form of a route guidance object provided in the AR navigation of the related art cannot be expressed in an accurate composition, so that it is difficult for a driver to accurately understand a route through an object. In addition, in the AR navigation of the related art, various advanced driver assistance system (ADAS) objects, etc. are simply expressed as icons, which reduces the sense of reality, an advantage of AR, to lower driving convenience of drivers.

SUMMARY

An aspect of the present invention may provide a method of implementing a route guidance object displayed through augmented reality by combining a lane marking recognized during driving of a vehicle and link linear data of route data.

An aspect of the present invention may also provide a method of implementing a route guidance object displayed through AR that is intuitive, dynamic, and realistic to a driver.

An aspect of the present invention may also provide a method for expressing a lane departure warning system (LDWS) in a route guidance object when a lane departure occurs during driving of a vehicle.

According to an aspect of the present invention, an augmented reality (AR)-based route guidance method using a processor includes: acquiring a driving image captured by an image capturing device of a vehicle which is running; acquiring route data to a destination of the vehicle; recognizing both side lane markings of a lane in which the vehicle is running from the acquired driving image; generating first route guidance linear data based on the recognized both side lane markings for a region in which both side lane markings are recognized in the driving image; generating second route guidance linear data using link linear data of the route data for a region in which both side lane markings are not recognized in the driving image; combining the first route guidance linear data and the second route guidance linear data to generate combined route guidance linear data; and displaying a route guidance object in AR using the generated combined route guidance linear data.

The generating of the second route guidance linear data may include: calculating a translation value of points constituting the link linear data based on a position of a first point constituting the first route guidance linear data; and translating points constituting the link linear data based on the calculated translation value.

The generating of the second route guidance linear data may include: calculating a rotation angle of the link linear data based on a difference in angle between a driving direction vector of the vehicle and a route direction vector of the vehicle; and rotating the link linear data according to the translation based on the calculated rotation angle.

The AR-based route guidance method may further include: when only one side lane marking is recognized in the driving image, generating a virtual lane marking for the other side lane marking based on lane marking width data.

The route guidance object may include: a first route guidance object having a center in the combined route guidance linear data and having an arrow shape indicating a route along which the vehicle is to run; a second route guidance object indicated between a left side of the first route guidance object and a left lane marking; and a third route guidance object indicated between a right side of the first route guidance object and a right lane marking.

The route guidance object may be displayed to move from the front to the rear when the vehicle is running forwards, and a movement speed of the route guidance object may vary according to a speed of the vehicle.

The AR-based route guidance method may further include: when the vehicle approaches a turn point, displaying a turn point guidance object, without displaying the route guidance object.

The AR-based route guidance method may further include: when the vehicle leaves a lane marking, changing and displaying a display state of at least one of the second route guidance object and the third route guidance object.

According to an aspect of the present invention, an electronic device for performing augmented reality (AR)-based route guidance includes: a display unit configured to display a screen; a driving image acquiring unit configured to acquire a driving image captured by an image capturing device of a vehicle which is running; a route data acquiring unit configured to acquire route data to a destination of the vehicle; a lane marking recognizing unit configured to recognize both side lane markings of a lane in which the vehicle is running from the acquired driving image; a route guidance linear data generating unit configured to generate first route guidance linear data based on the recognized both side lane markings for a region in which the both side lane markings are recognized in the driving image, generate second route guidance linear data using the link linear data of the route data for a region in which both side lane markings are not recognized in the driving image, and generate a combined route guidance linear data by coupling the first route guidance linear data and the second route guidance linear data; and a controller configured to control the display unit to display a route guidance object on an AR image using the generated combined route guidance linear data.

The route guidance object may include: a first route guidance object having a center in the combined route guidance linear data and having an arrow shape indicating a route along which the vehicle is to run; a second route guidance object indicated between a left side of the first route guidance object and a left lane marking; and a third route guidance object indicated between a right side of the first route guidance object and a right lane marking.

The route guidance object may be moved from the front to the rear and displayed in the AR image, and a movement speed of the route guidance object may vary according to a speed of the vehicle.

The controller may control the display unit to display a turn point guidance object, without displaying the route guidance object, when the vehicle approaches a turn point.

When the vehicle leaves a lane marking, the controller may control the display unit to change a display state of at least one of the second route guidance object and the third route guidance object and display the changed display state.

According to an aspect of the present invention, an augmented reality (AR) processing device includes: a driving image acquiring unit configured to acquire a driving image captured by an image capturing device of a vehicle which is running; a route data acquiring unit configured to acquire route data to a destination of the vehicle; a lane marking recognizing unit configured to recognize both side lane markings of a lane in which the vehicle is running from the acquired driving image; a route guidance linear data generating unit configured to generate first route guidance linear data based on the recognized both side lane markings for a region in which both side lane markings are recognized in the driving image, generate second route guidance linear data using link linear data of the route data for a region in which both side lane markings are not recognized in the driving image, and combine the first route guidance linear data and the second route guidance linear data to generate combined route guidance linear data; and an AR image generating unit configured to generate an AR image in which a route guidance object is mapped based on the generated combined route guidance linear data.

The route guidance linear data generating unit may calculate a translation value of points constituting the link linear data based on a position of a first point constituting the first route guidance linear data and translate points constituting the link linear data based on the calculated translation value.

The route guidance linear data generating unit may calculate a rotation angle of the link linear data based on a difference in angle between a driving direction vector of the vehicle and a route direction vector of the vehicle and rotate the link linear data according to the translation based on the calculated rotation angle.

When only one side lane marking is recognized in the driving image, the route guidance linear data generating unit may generate a virtual lane marking for the other side lane marking based on lane marking width data.

According to an aspect of the present invention, a program stored in a computer-readable recording medium including a program code for performing the augmented reality (AR)-based route guidance method described above may be provided.

According to an aspect of the present invention, a computer-readable recording medium storing a program for performing the augmented reality (AR)-based route guidance method described above may be provided.

DETAILED DESCRIPTION

Figure 1:
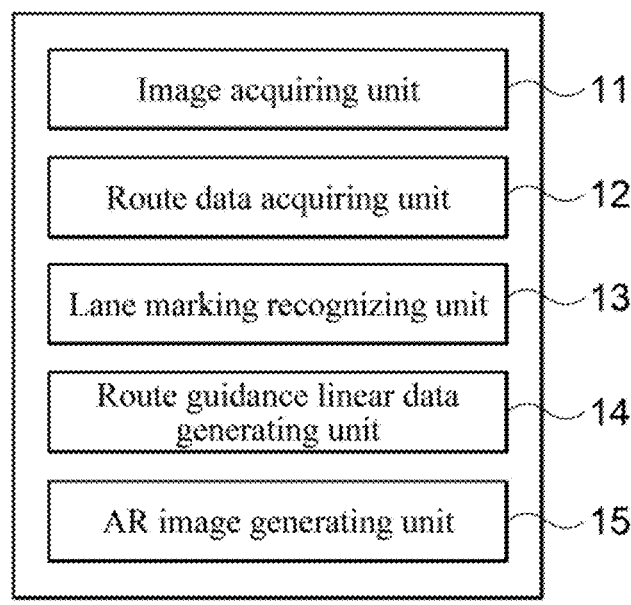
FIG. 1 is a block diagram illustrating an AR (AR) processing device according to an exemplary embodiment of the present invention.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore, it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may be tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having the capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

Figure 2:
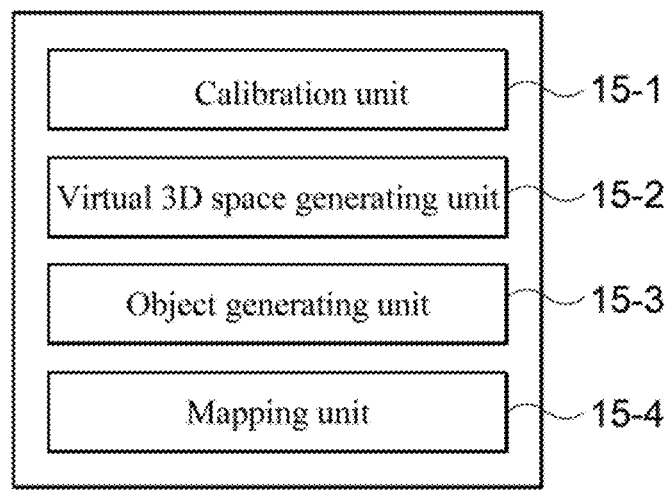
FIG. 2 is a block diagram specifically illustrating an AR image generating unit according to an exemplary embodiment of the present invention.

FIG. 1 is a block diagram illustrating an AR processing device according to an exemplary embodiment of the present invention. FIG. 2 is a block diagram specifically illustrating an AR image generating unit according to an exemplary embodiment of the present invention. Referring to FIGS. 1 and 2, the AR processing device 10 may include an image acquiring unit 11, a route data acquiring unit 12, a lane marking recognizing unit 13, a route guidance linear data generating unit 14, and an AR image generating unit 15.

Here, the AR image generating unit 15 may include all or some of a calibration unit 15-1, a virtual 3D space generating unit 15-2, an object generating unit 15-3, and a mapping unit 15-4.

The AR processing device 10 may generate an AR image for guiding a vehicle user based on a driving image captured by an image capturing device of a vehicle.

Here, driving of the vehicle refers to a state in which the vehicle is driven by a driver and located on the road, and may have a concept of including all of a driving state in which the vehicle is running on the road, a stopped state in which the vehicle is standing on the road, and a parking state of the vehicle.

In addition, the vehicle user may be a concept including both a vehicle driver and a vehicle non-driver (e.g., a fellow passenger, a passenger, etc.)

In addition, the drive image captured by the imaging device of the vehicle may include a front drive image according to imaging of a front of the vehicle and a rear drive image according to imaging of a rear of the vehicle.

The AR processing device 10 may be implemented using software, hardware, or a combination thereof. For example, according to hardware implementation, the lane marking detecting apparatus 10 may be implemented using at least one of application specific integrated circuits (ASICs), digital signal processors (DSPs), digital signal processing devices (DSPDs), programmable logic devices (PLDs), field programmable gate arrays (FPGAs), processors), controllers, micro-controllers, micro-processors, and electric units for performing other functions.

Hereinafter, for convenience of description, each component module of the AR processing device 10 will be described in detail based on a case in which the drive image is a front drive image as an example.

The image acquiring unit 11 may acquire a drive image captured by the imaging device of the vehicle. Specifically, the image acquiring unit 11 may acquire, in real time, a drive image captured by the imaging device installed in the vehicle while the vehicle is running.

Here, the acquired drive image may include a plurality of lanes demarcated along a lane marking, a road including a plurality of lanes, and a plurality of vehicles running on the road.

A lane marking may refer to each of both side lines forming a lane in which a vehicle is located. In addition, a lane may refer to a road formed by lane markings such as a primary lane, a secondary lane, or an N lane, in which a vehicle is running.

The route data acquiring unit 12 may acquire route data to the destination of the vehicle from the map data. Here, the map data may be obtained from the storage unit 110 of the electronic device 100 in which the AR processing device 10 is installed, may be obtained through wired/wireless communication between the electronic device 100 and a separate external map database, or may be obtained from another electronic device.

The route data may include link data and node data for indicating a route to the destination of the vehicle.

Here, the link data may include link linear data and link attribute data.

That is, in the map data, a road or each lane constituting the road may be configured by a connection of a plurality of links, the link linear data may be data representing linear characteristics of a link, and a position data for at least one point constituting a line may be allocated to the link linear data. Here, the position data may be GPS data. Such link linear data may be used to generate route guidance linear data for display of a route guidance object in AR.

Also, the link attribute data may include at least one of an identifier of a link, data indicating whether the link is a bidirectional link or a unidirectional link, starting and ending points of a link based on a vehicle traveling direction, a road number, a road name, a road length, road rank information, road type information, road width data, road land number data and road slope data, and guidance code data (e.g., data for guiding speed limits, control points, etc.).

The node data may include an identifier of a node, attribute data for the node, and position data for the node. Here, the position data may be GPS data, and the node attribute data may include a direction attribute of the node.

The lane marking recognizing unit 13 may recognize a lane marking of a lane in which the vehicle is running from the driving image obtained by the image acquiring unit 11. Specifically, the lane marking recognizing unit 13 may detect an edge corresponding to the lane marking in the driving image acquired by the image acquiring unit 11 and generate an edge image based on the detected edge. In addition, the lane marking recognizing unit 13 may detect a straight line component based on the detected edge and generate an edge straight line processed image based on the detected straight line component. In addition, the lane marking recognizing unit 13 may detect a lane marking point corresponding to the lane marking using the generated edge image and the edge straight line processed image. In addition, the lane marking recognizing unit 13 may recognize a lane marking based on the detected lane marking point.

In this case, the lane marking recognizing unit 13 may recognize both sides lane markings in which the vehicle is running by detecting a lane marking point corresponding to a left lane marking and a lane marking point corresponding to right lane marking, respectively.

The route guidance linear data generating unit 14 may generate route guidance linear data used to display a route guidance object in AR. Specifically, the route guidance linear data generating unit 14 may generate first route guidance linear data based on the recognized both lane markings for a region in which the both lane markings are recognized in the driving image, and generate second route guidance linear data using link linear data of the route data for a region in which both sides lane markings are not recognized in the driving image. In addition, the route guidance linear data generating unit 14 may combine the generated first route guidance linear data and the second route guidance linear data to generate combined route guidance linear data.

The operation of the route guidance linear data generating unit 14 will be described in more detail with reference to FIGS. 3 to 4.

Figure 3:
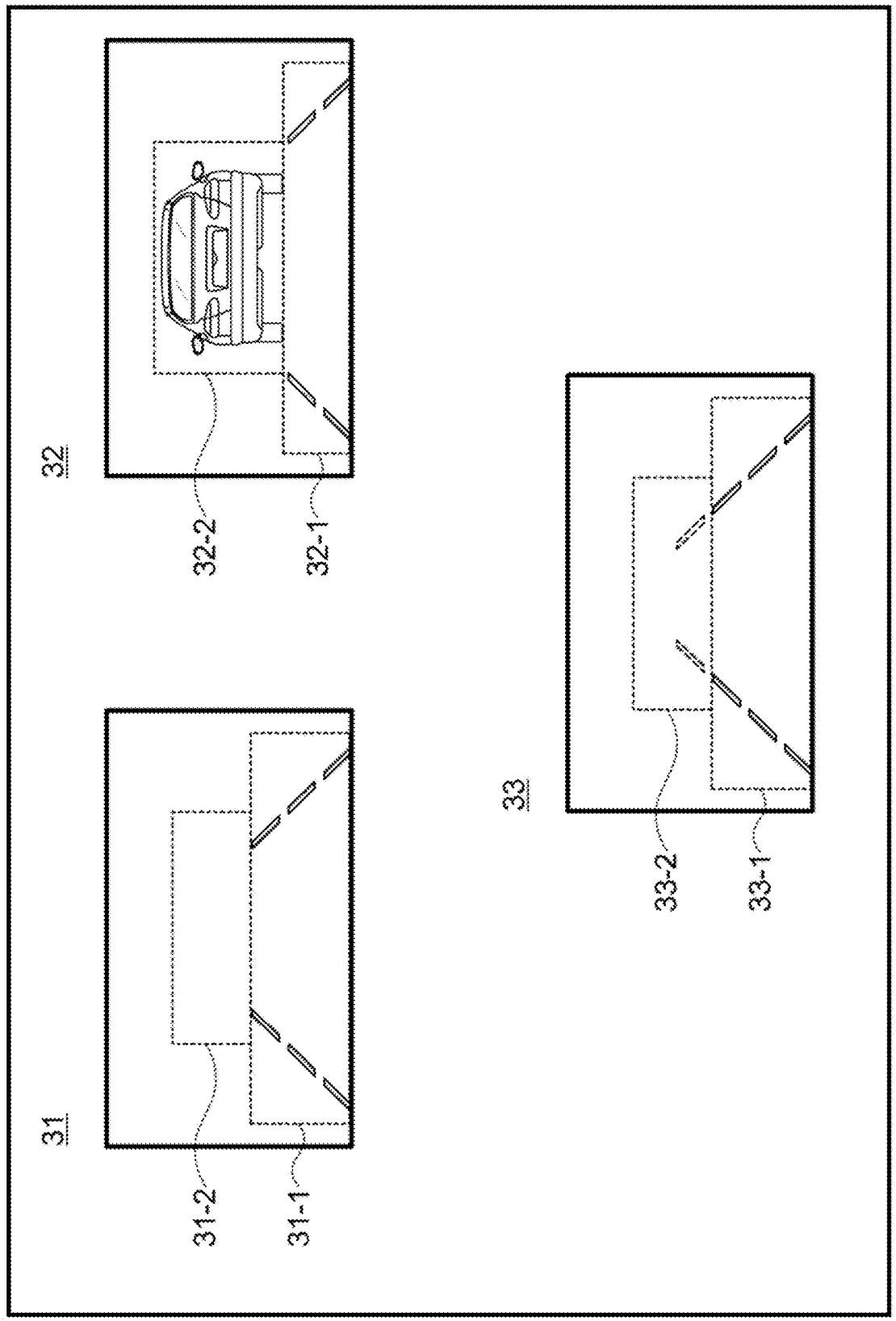
FIG. 3 is a view illustrating a driving environment of a vehicle according to an exemplary embodiment of the present invention.
Figure 4:
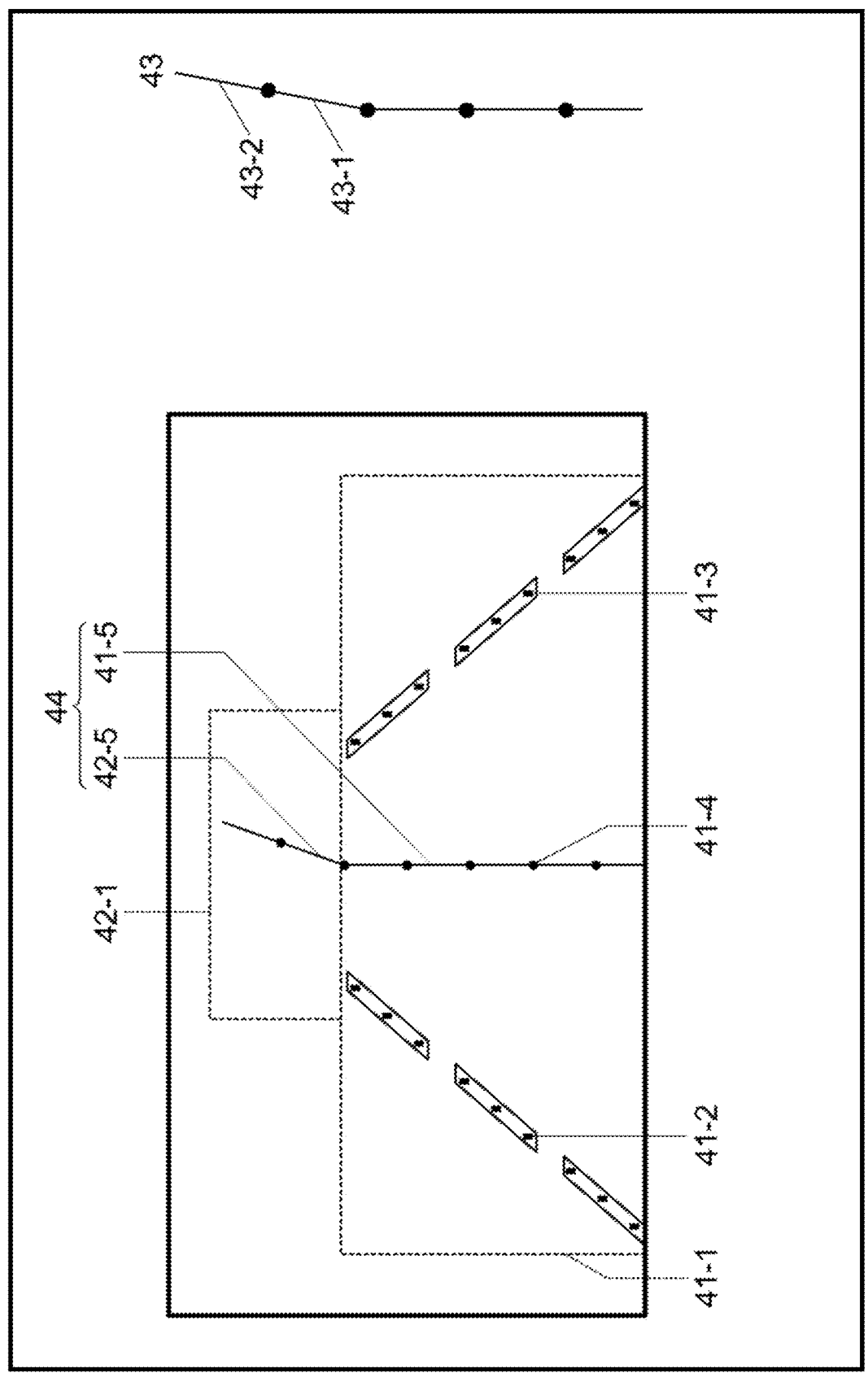
FIG. 4 is a view illustrating a method of generating a route guidance linear data according to an exemplary embodiment of the present invention.

FIG. 3 is a view illustrating a driving environment of a vehicle according to an exemplary embodiment of the present invention. FIG. 4 is a view illustrating a method of generating a route guidance line according to an exemplary embodiment of the present invention.

There may be a case 31 in which the vehicle travels in a lane region 31-2 in which part of a lane marking is erased while driving or a case 32 in which the vehicle travels in a lane region 32-2 in which part of a lane marking is blocked by a preceding vehicle. In this case, the lane marking recognizing unit 13 may recognize the lane marking in part of lane regions 31-1 and 32-1 located in front of the vehicle, but may not recognize a lane marking in the remaining part of lane regions 31-2 and 32-2.

Alternatively, there may be a case 33 in which a lane marking is not recognized by the lane marking recognizing unit 13 because the lane marking is blurred or located at a distance. Also, in this case, the lane marking recognizing unit 13 may recognize a lane marking in part of a lane region 33-1 located in front of the vehicle but may not recognize a lane marking in the remaining part of lane region 33-2.

Accordingly, with respect to a region 41-1 in which both side lane markings are recognized in the driving image, first route guidance linear data may be generated based on the recognized both side lane markings. Specifically, the route guidance linear data generating unit 14 may determine a virtual point 41-4 located in the middle based on a plurality of points 41-2 constituting a left lane marking detected by the lane marking recognizing unit 13 and a plurality of points 41-3 constituting a right lane marking and connect the virtual points to generate first route guidance linear data 41-5.

However, in the driving image, with respect to the region 42-1 in which both lane markings are not recognized, second route guidance linear data may be generated using the link linear data of the route data. Specifically, the route guidance linear data generating unit 14 may detect link linear data 43-1 and 43-2 corresponding to the region 41-1 in which the both side lane markings are not recognized based on a current position of the vehicle, among a plurality of link linear data 43, and generate the second route guidance linear data 42-5 based on the detected link linear data 43-1 and 43-2.

Meanwhile, the route guidance linear data generating unit 14 may combine the generated first route guidance linear data 41-5 and the second route guidance linear data 42-5 to generate combined route guidance linear data 44.

Meanwhile, when generating the combined route guidance linear data 44, the route guidance linear data generating unit 14 may perform error correction of the second route guidance linear data 42-5.

Specifically, the route guidance linear data generating unit 14 may calculate translation values of points constituting the link linear data based on a position of a first point constituting the first route guidance linear data. In addition, the route guidance linear data generating unit 14 may translate the points constituting the link linear data based on the calculated translation value.

Also, the route guidance linear data generating unit 14 may calculate a rotation angle of the link linear data based on an angle difference between a driving direction vector of the vehicle and a route direction vector of the vehicle. In addition, the route guidance linear data generating unit 14 may rotate the link linear data according to the translation based on the calculated rotation angle.

The error correction of the route guidance linear data generating unit 14 will be described in more detail with reference to FIGS. 5 to 6.

Figure 5:
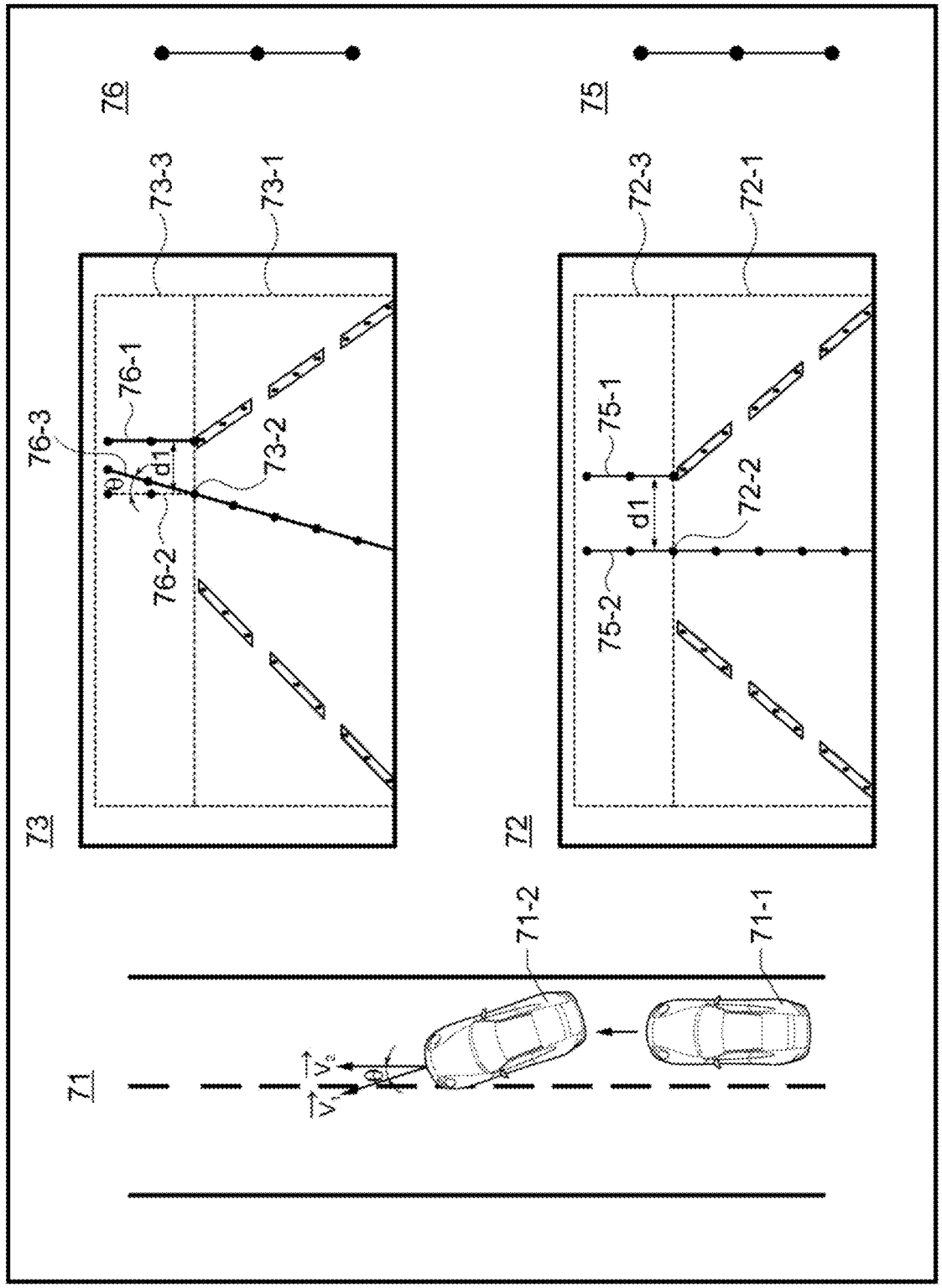
FIG. 5 is a view illustrating correction of an error of second route guidance linear data when a vehicle changes lanes according to an exemplary embodiment of the present invention.

FIG. 5 is a view illustrating error correction of second route guidance linear data when changing lanes of a vehicle according to an exemplary embodiment of the present invention.

Reference numeral 71 denotes a process of changing a lane from a second lane to a first lane while the vehicle is running, and an image captured in a vehicle 71-1 driving in the second lane may correspond to reference numeral 72, and an image captured in a vehicle 71-2 changing to the first lane may correspond to reference numeral 73.

In this case, the route guidance linear data generating unit 14 may generate first route guidance linear data based on the recognized both side lanes for regions 72-1 and 73-1 in which both side lanes are recognized in the driving image.

However, in the driving image, for regions 72-3 and 73-3 in which both side lanes are not recognized, the route guidance linear data generating unit 14 may generate second route guidance linear data using link linear data 75 and 76 of the route data.

In this case, a position error may exist between the position data of the vehicle and the position data allocated to the link linear data. Accordingly, the route guidance linear data generating unit 14 according to an exemplary embodiment of the present invention may determine a position of first points 72-2 and 73-2 constituting the first route guidance linear data based on the position data of the vehicles 71-1 and 71-2 in motion and determine initial positions 75-1 and 76-1 of the points constituting the link linear data based on the position data of the link linear data 75 and 76. Here, the first points 72-2 and 73-2 may be the last points of the first route guidance linear data of the recognition regions 72-1 and 73-1.

Meanwhile, the route guidance linear data generating unit 14 may calculate a translation value dl of the initial positions 75-1 and 76-1 of the points constituting the link linear data based on the positions of the first points 72-2 and 73-2 constituting the first route guidance linear data. Also, the route guidance linear data generating unit 14 may generate second route guidance linear data 75-2 and 76-2 obtained by translating the points constituting the link linear data based on the calculated translation value dl.

Meanwhile, when an optical axis vector $V_1$ of the vehicle and a route direction vector $V_2$ of the vehicle are different from each other as in the vehicle 71-2 changing to the first lane, an angular error may exist. Here, the optical axis vector $V_1$ of the camera installed in the vehicle has the same meaning as a driving direction vector facing a driving direction of the vehicle and may be used as the same concept.

Accordingly, the route guidance linear data generating unit 14 may calculate a rotation angle of the link linear data based on an angular difference θ between the optical axis vector $V_1$ of the vehicle and the route direction vector $V_2$ of the vehicle. As an example, the rotation angle may include a rotation direction and a magnitude of a rotation angle of the route direction vector $V_2$ of the vehicle based on the optical axis vector $V_1$ of the vehicle.

Also, the route guidance linear data generating unit 14 may rotate the link linear data according to the translation at the same rotational angle in the same rotational direction based on the calculated rotation angle.

Accordingly, the route guidance linear data generating unit 14 may generate second route guidance linear data 76-3 obtained by correcting a position error and an angle error.

Figure 6:
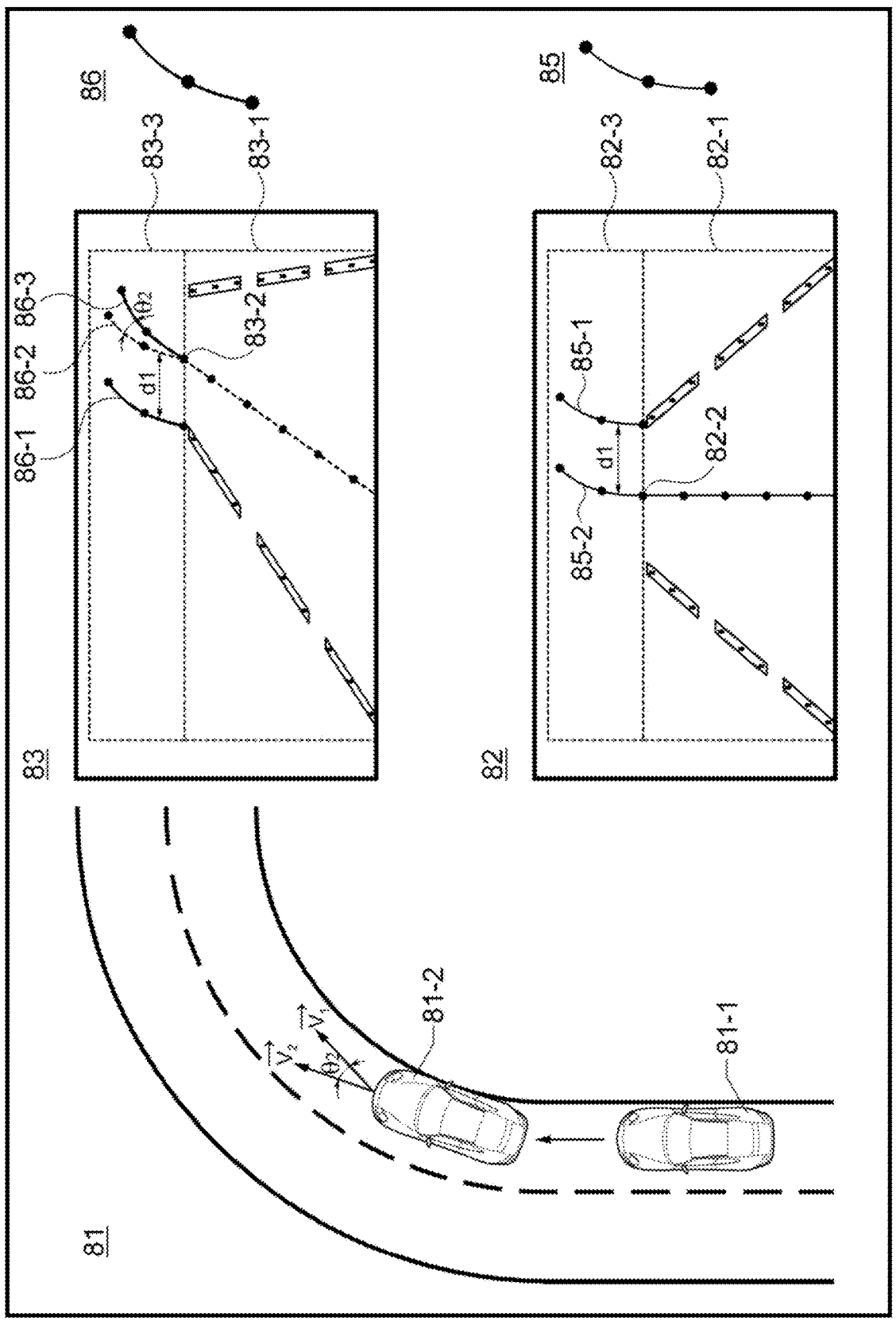
FIG. 6 is a view illustrating correction of an error of second route guidance linear data when a vehicle is driving in a curve section according to an exemplary embodiment of the present invention.

FIG. 6 is a view illustrating error correction of the second route guidance linear data when a vehicle is running on a curve according to an exemplary embodiment of the present invention.

Reference numeral 81 denotes that the vehicle travels in a curve section, and an image captured in a vehicle 81-1 before entering the curve section may correspond to reference numeral 82, and an image captured in a vehicle 81-2 driving in the curve section may correspond to reference numeral 83.

In this case, for regions 82-1 and 83-1 in which both side lanes are recognized in the driving images, the route guidance linear data generating unit 14 may generate first route guidance linear data based on the recognized both side lanes.

However, for regions 82-3 and 83-3 in which both side lanes are not recognized in the driving images, the route guidance linear data generating unit 14 may generate second route guidance linear data using link linear data 85 and 86 of the route data.

In this case, a position error may exist between the position data of the vehicle and the position data allocated to the link linear data. Thus, the route guidance linear data generating unit 14 according to an exemplary embodiment of the present invention may determine positions of first points 82-2 and 83-2 constituting the first route guidance linear data and determine initial positions 85-1 and 86-1 of the points constituting the link linear data based on the position data of the link linear data 85 and 86. Here, the first points 82-2 and 83-2 may be the last points of the first route guidance linear data of the recognition regions 82-1 and 83-1.

Meanwhile, the route guidance linear data generating unit 14 may calculate a translation value dl of the initial positions 85-1 and 86-1 of the points constituting the link linear data based on the positions of the first points 82-2 and 83-2 constituting the first route guidance linear data. Also, the route guidance linear data generating unit 14 may generate second route guidance data 85-2 and 86-2 obtained by translating the points constituting the link linear data based on the calculated translation value dl.

Meanwhile, when the vehicle runs in a curve section, since the optical axis vector $V_1$ of the vehicle and the route direction vector $V_2$ of the vehicle are different from each other, and thus, an angular error may exist. Accordingly, the route guidance linear data generating unit 14 may calculate a rotation angle of the link linear data based on angular differences $\theta_1$ and $\theta_2$ between the vehicle optical axis vector $V_1$ and the vehicle route direction vector $V_2$.

As an example, the rotation angle may include a rotation direction and a magnitude of the rotation angle of the route direction vector $V_2$ of the vehicle based on the optical axis vector $V_1$ of the vehicle.

Also, the route guidance linear data generating unit 14 may rotate the link linear data according to translation based on the calculated rotation angle in the same rotation direction at the same rotation angle. Accordingly, the route guidance linear data generating unit 14 may generate second route guidance linear data 86-3 in which the position error and the angle error are corrected.

However, since there is no angle difference between the optical axis vector $V_1$ of the camera and the route direction vector $V_2$ of the vehicle before entering the curve section, rotation correction may be unnecessary.

Meanwhile, when only one lane marking is recognized in the driving image, the route guidance linear data generating unit 14 may generate a virtual lane marking for the other side lane marking based on the lane width data. Also, the route guidance linear data generating unit 14 may determine a virtual point located in the middle based on the one side lane marking recognized by the lane marking recognizing unit 13 and a virtual lane marking of the other side generated virtually, and connect virtual points to generate route guidance linear data. In addition, the route guidance linear data generating unit 14 may combine the route guidance linear data generated through the virtual point with route guidance linear data of a region in which both lane markings are not recognized, to generate combined route guidance linear data.

Meanwhile, the AR image generating unit 15 may generate an AR image for displaying various objects on the AR using the combined route guidance linear data generated by the route guidance linear data generating unit 14. The AR image generating unit 15 will be described in more detail with reference to FIG. 2.

The calibration unit 15-1 may perform calibration for estimating a camera parameter corresponding to a camera from a captured image captured by the camera. Here, the camera parameter may be a parameter constituting a camera matrix, which is information indicating a relationship between an actual space (or the real world) and a photograph.

Figures 7A, 7B:
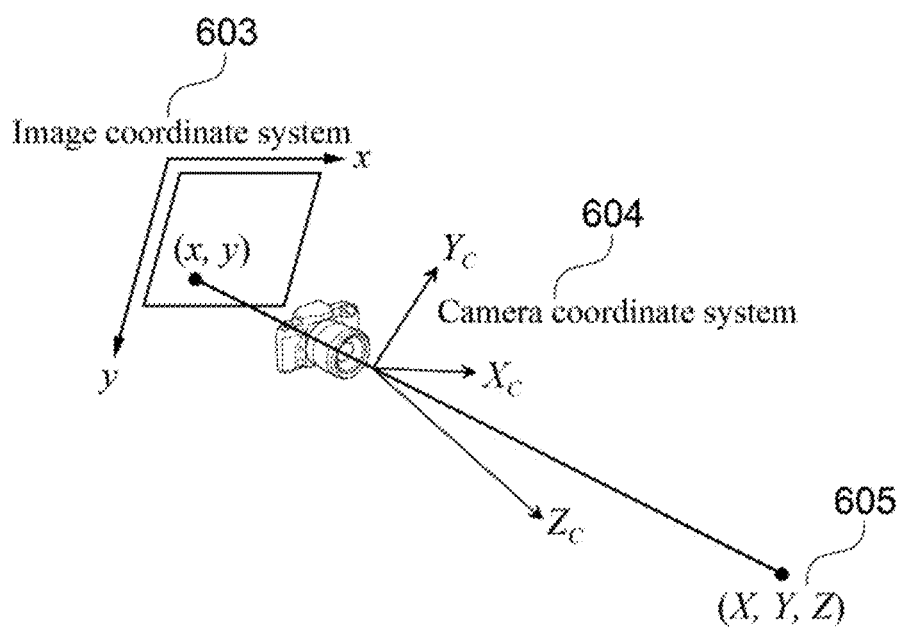
FIGS. 7A and 7B are views illustrating a conversion relation between a captured image and a virtual 3D space according to an exemplary embodiment of the present invention.

Here, as shown in FIG. 7A, the parameter may include extrinsic parameters 601 and intrinsic parameters 602. Here, fx and fy of the intrinsic parameters 602 may be focal lengths, cx and cy may be principal points, and skew_c=tan α may be skew coefficients. In addition, the extrinsic parameters 601 may be rotation/translation conversion matrix for converting the coordinates X, Y, and Z of a 3D point on a world coordinate system 605 into coordinates Xc, Yc, and Zc of the 3D point on a camera coordinate system 604. Since these extrinsic parameters of the camera are not parameters unique to the camera, the extrinsic parameters may vary depending on where and in what direction the camera is installed, and may also vary depending on how the world coordinate system is defined.

That is, the calibration unit 15-1 according to the present invention may perform calibration for estimating a camera parameter corresponding to a camera from a captured image.

The virtual 3D space generating unit 15-2 may generate a virtual 3D space based on the captured image captured by the camera. Specifically, the virtual 3D space generating unit 15-2 may acquire depth information from the image captured by the camera based on the camera parameter estimated by the calibration unit 15-1, and generate a virtual 3D space based on the acquired depth information and the captured image. Specifically, referring to FIG. 7B, the camera-captured image is obtained by perspective-projecting points on a three-dimensional (3D) space of the world coordinate system 605 onto a two-dimensional (2D) image plane of the image coordinate system 603. Accordingly, the 3D space generating unit 15-2 may generate a virtual 3D space of the world coordinate system 605 for the captured image of the camera by performing a reverse process of the operation described above based on the camera parameters.

That is, the virtual 3D space generating unit 15-2 according to the present invention obtains depth information from the driving image based on the camera parameter estimated by the calibration unit 15-1 and generates a virtual 3D space based on the depth information and the driving image.

The object generating unit 15-3 may generate various objects for guidance on the AR. In the present invention, an object will be described as referring to various graphic elements displayed through AR. Here, the object may include various graphic elements for guidance, while the vehicle is driving, such as a front vehicle collision avoidance guidance object, a route guidance object, a lane departure guidance object, a curve guidance object, and a turn point guidance object.

For example, when a request for route guidance to a destination is input by a user, the object generating unit 15-3 may generate a route guidance object for displaying a route from a current position of the vehicle to the destination on a captured image corresponding to the real world. Such a route guidance object will be described in detail with reference to FIG. 8.

Figure 8:
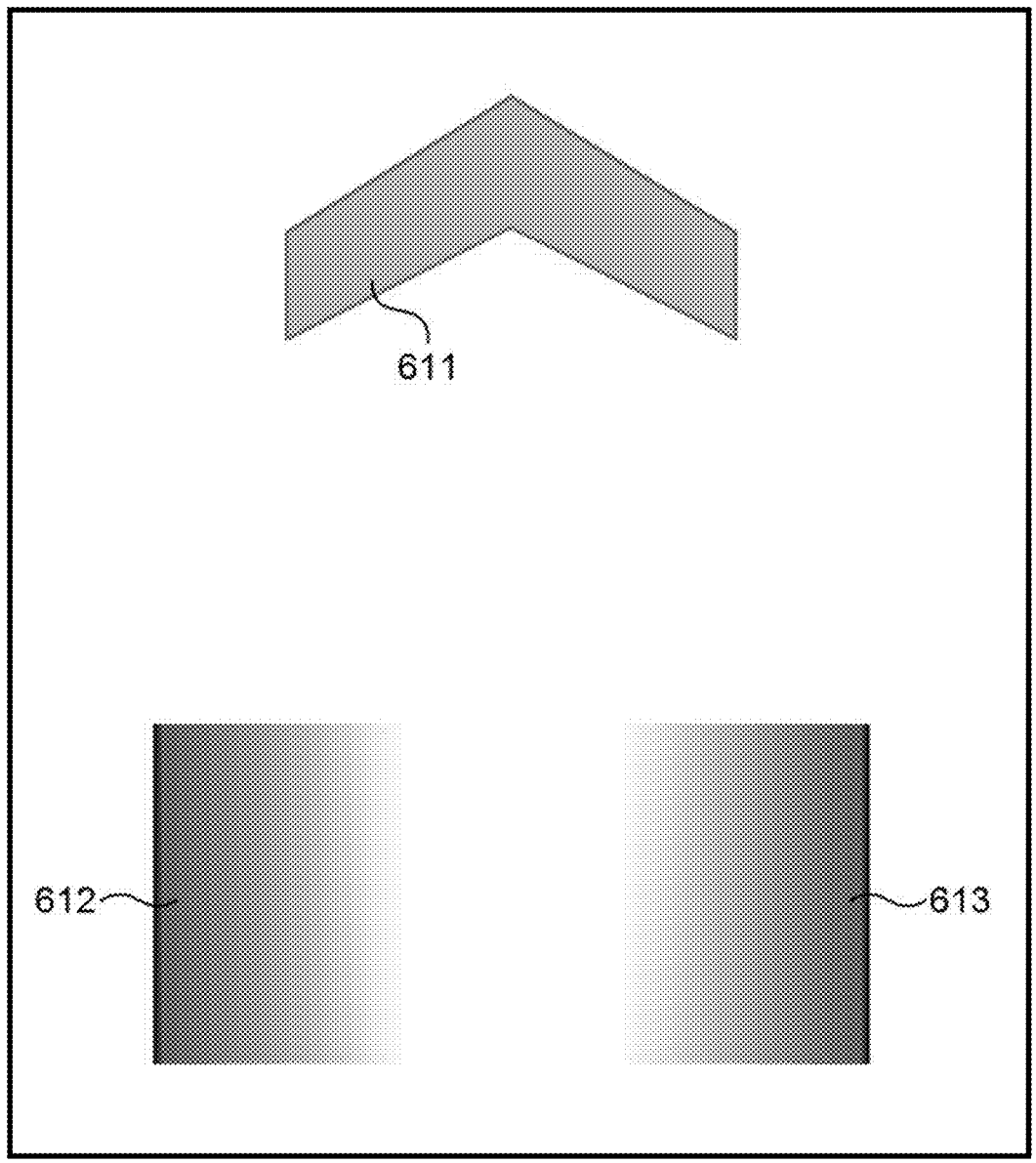
FIG. 8 is a view illustrating a route guidance object according to an exemplary embodiment of the present invention.

Referring to FIG. 8, a route guidance object generated by the object generating unit 15-3 may include a first route guidance object 611 in an arrow shape and second and third route guidance objects 612 and 613 in a rectangular shape. Here, the first route guidance object 611 has an arrow shape pointing to a route on which the vehicle should travel, and may be arranged based on the combined route guidance linear data generated by the route guidance linear data generating unit 14 and displayed through AR. In addition, the second route guidance object 612 may be disposed between the left of the first route guidance object 611 and a left lane marking and displayed through AR, and the third route guidance object 613 may be disposed between the right of the first route guidance object 611 and a right lane marking and displayed through AR.

Here, the colors of the route guidance objects 611, 612, and 613 may vary according to the driving environment of the vehicle. In addition, the second route guidance object 612 and the third route guidance object 613 may be implemented such that transparency thereof increases from the outside to the inside.

Meanwhile, the object generating unit 15-3 may generate a lane departure guidance object for guiding lane departure in a captured image corresponding to the real world when the vehicle deviates from a lane marking of a lane in which the vehicle is running.

Also, when the vehicle approaches the turn point while the vehicle is running, the object generating unit 15-3 may generate a turn point guidance object for guiding a turn point in a captured image corresponding to the real world.

Also, when the vehicle approaches a front vehicle while driving, the object generating unit 15-3 may generate a front vehicle collision avoidance guidance object in a captured image corresponding to the real world.

Here, the object may be implemented as a 3D object, a texture image, or an art line.

The mapping unit 15-4 may determine a mapping position of an object generated by the object generating unit 15-3 in the virtual 3D space generated by the virtual 3D space generating unit 15-2, and map the object to the determined mapping position. That is, the mapping unit 16-4 according to the present invention may determine the mapping position in the virtual 3D space according to a type of the guidance object generated by the object generating unit 15-3 and generate virtual 3D spatial data mapped to the determined mapping position.

The AR image generating unit 15 may generate an AR image by converting the virtual 3D spatial data to which the object is mapped into a 2D image using a camera matrix.

When a route guidance object is generated by the object generating unit 15-3, the mapping unit 15-4 may calculate a position of a combined route guidance linear data generated by the route guidance linear data generating unit 14 in the virtual 3D space, a position of a left lane marking in the virtual 3D space, and a position of a right lane marking in the virtual 3D space. Also, the mapping unit 15-4 may determine a mapping position of the route guidance object based on the positions calculated in the virtual 3D space, and generate virtual 3D space data mapped to the determined mapping position.

In this case, the mapping unit 15-4 may determine the mapping position of the route guidance object so that the center of the first route guidance object 611 is located at the position of the combined route guidance linear data in the virtual 3D space. In addition, the mapping unit 15-4 may determine the mapping position of the second route guidance object 612 between the position of the left lane marking in the virtual 3D space and the position of the first route guidance object 611 in the virtual 3D space. In addition, the mapping unit 15-4 may determine the mapping position of the third route guidance object 613 between the position of the right lane marking in the virtual 3D space and the position of the first route guidance object 611 in the virtual 3D space. Also, the mapping unit 15-4 may generate virtual 3D spatial data mapped to the determined mapping positions of the first route guidance object 611, the second route guidance object 612, and the third route guidance object 613, respectively. In addition, the AR image generating unit 15 may generate an AR image by converting the virtual 3D spatial data to which the route guidance objects 611, 612, and 613 are mapped into a 2D image using a camera matrix. Accordingly, the image captured by the camera and the route guidance objects 611, 612, and 613 may be overlapped and displayed on the AR image.

Here, the first route guidance object 611 may be displayed by moving from front to rear when the vehicle is driving forward. That is, the first route guidance object 611 displayed in front of the vehicle may be displayed closer to the vehicle when the vehicle is running forward.

Also, a moving speed of the first route guidance object 611 may vary according to a driving speed of the vehicle. That is, when a forward driving speed of the vehicle increases, the speed at which the first route guidance object 611 moves from front to rear may also increase. Also, when the forward driving speed of the vehicle decreases, the speed at which the first route guidance object 611 moves from front to rear may also decrease. Also, when the vehicle's forward driving speed is "0" in a stopped state, the moving speed of the first route guidance object 611 may also be "0" and may not move.

When at least one of a turn point guidance object, a front vehicle collision avoidance guidance object, and a lane departure avoidance guidance object is generated in the object generating unit 15-3, the mapping unit 15-4 may calculate positions of the generated objects in virtual 3D space. In addition, the mapping unit 15-4 may determine mapping positions of the objects based on the positions calculated in the virtual 3D space, and generate virtual 3D space data mapped to the determined mapping positions. In addition, the AR image generating unit 15 may generate an AR image by converting the virtual 3D spatial data to which an object is mapped into a 2D image using a camera matrix. Accordingly, at least one of the camera-captured image, the turn point guidance object, the front vehicle collision avoidance guidance object, and the lane departure avoidance guidance object may be displayed on the AR image.

Meanwhile, when the vehicle leaves the lane marking, the AR image generating unit 15 may generate an AR image displayed by changing a display state of at least one of the second route guidance object 612 and the third route guidance object 613. For example, the AR image generating unit 15 may generate an AR image in which colors of the second route guidance object 612 and the third route guidance object 613 before the vehicle leaves the lane marking and colors of the second route guidance object 612 and the third route guidance object 613 after the vehicle leaves the lane marking are displayed to be different. As another example, the AR image generating unit 15 may generate an AR image in which a route guidance object corresponding to a lane marking side from which the vehicle deviates, among the second route guidance object 612 and the third route guidance object 613 (e.g., the second route guidance object 612 when the vehicle deviates from the left lane marking and the third route guidance object 613 when the vehicle deviates from the right lane marking), is displayed discriminately.

In addition, when the vehicle approaches a turn point, the AR image generating unit 15 may generate an AR image in which a turn point guidance object is displayed, without displaying the first route guidance object 611, the second route guidance object 612, and the third route guidance object 613.

Figure 9:
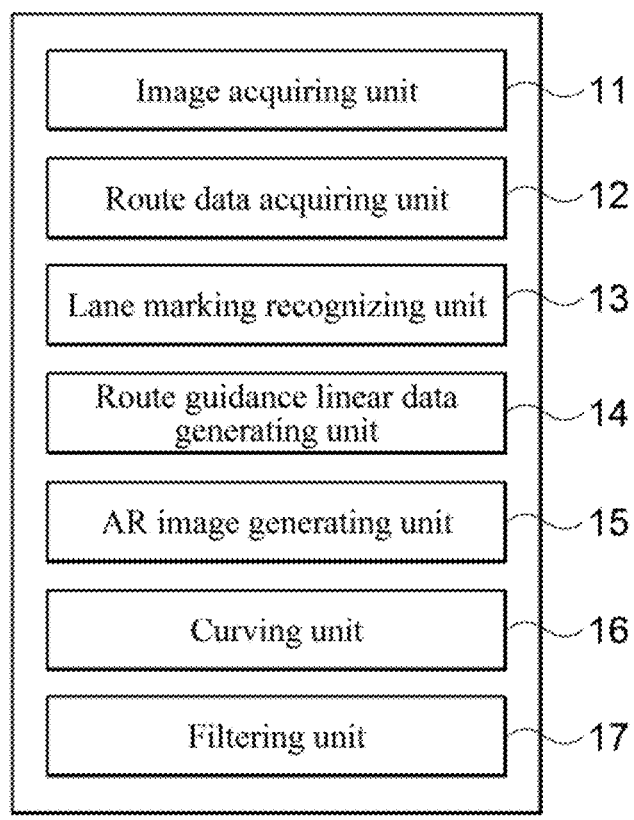
FIG. 9 is a view illustrating an AR processing device according to another exemplary embodiment of the present invention.

FIG. 9 is a block diagram illustrating an AR processing device according to another exemplary embodiment of the present invention. Referring to FIG. 9, the AR processing device 20 according to another exemplary embodiment of the present invention may further include a curving unit 16 and a filtering unit 17 in the AR processing device 10 according to FIG. 1.

The curving unit 16 may curve both side lane markings recognized by the lane marking recognizing unit 13.

Specifically, the curving unit 16 may detect a plurality of lane marking points from each of the recognized lane markings on both sides, project the detected lane marking points on a virtual 3D space through camera projection, and calculate a curved spatial linear line corresponding to the lane marking points in the virtual 3D space, thereby curving both side lane markings.

Also, the curving unit 16 may analyze even the first route guidance linear data and the second route guidance linear data generated by the route guidance linear data generating unit 14 and perform curving thereon in a virtual 3D space as described above.

Here, the curving unit 16 may perform curving on a Bezier curve, for example.

Through the curving process of the curving unit 16, an irregular lane marking recognition result may be calculated as a smooth lane marking.

Meanwhile, the filtering unit 17 may perform a filtering process on the spatial coordinates calculated in the operation process of the device.

Specifically, the filtering unit 17 may perform filtering to remove noise points from spatial coordinates in a virtual 3D space corresponding to a plurality of lane marking points of both side lane markings recognized by the lane marking recognizing unit 13.

In addition, the filtering unit 17 may analyze even the first and second route guidance linear data generated by the route guidance linear data generating unit 14 in a virtual 3D space and perform filtering as described above.

Here, the filtering unit 17 may perform filtering processing using, for example, a mean filter. By using such an average filter, it is possible to control the route guidance object to smoothly move by weighted-averaging the currently obtained spatial coordinates and past spatial coordinates when the vehicle changes a lane.

Figure 10:
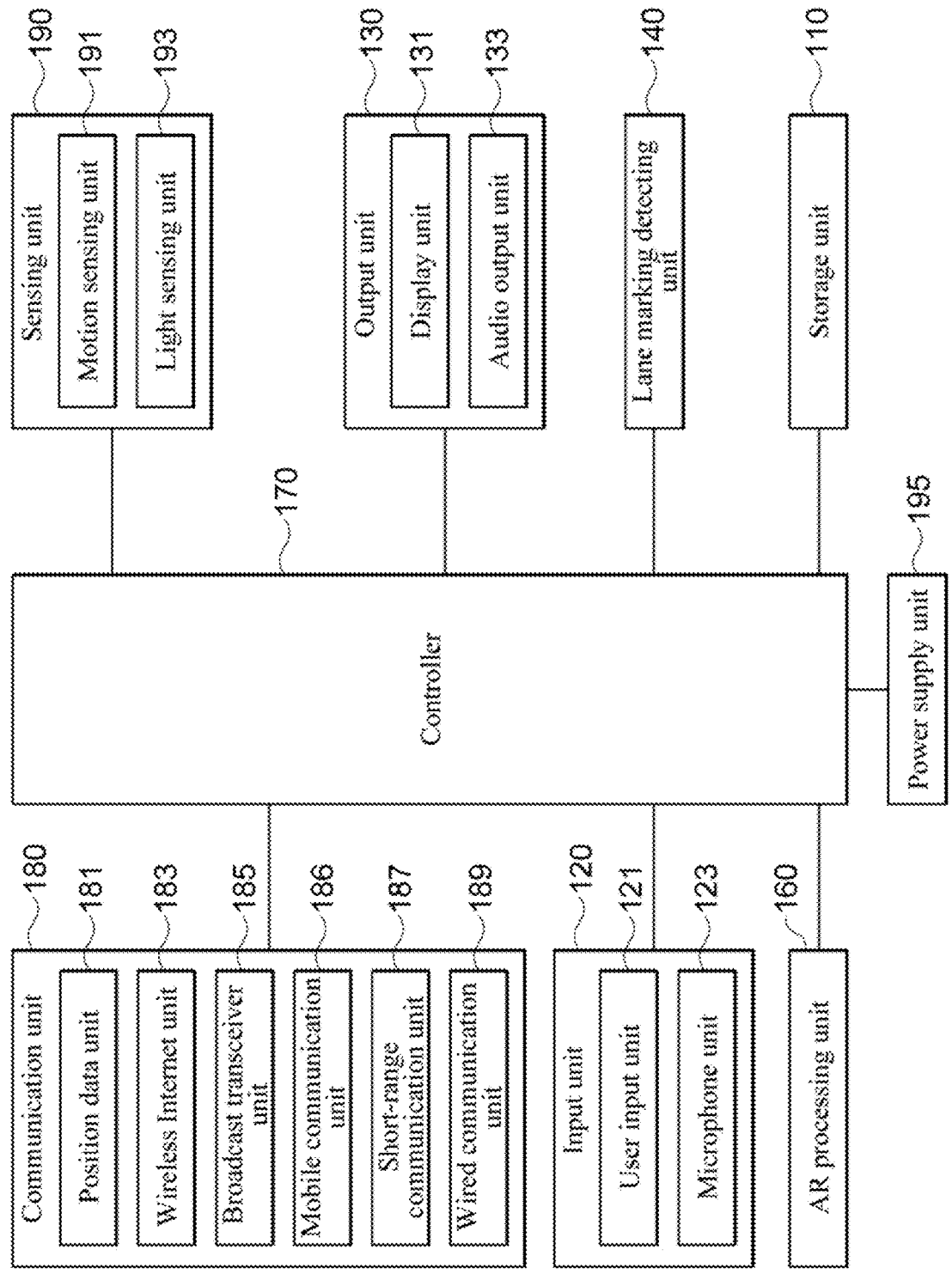
FIG. 10 is a block diagram of an electronic device according to an exemplary embodiment of the present invention.

FIG. 10 is a block diagram illustrating an electronic device according to an exemplary embodiment of the present invention. Referring to FIG. 10, the electronic device 100 includes all or some of a storage unit 110, an input unit 120, an output unit 130, an AR processing unit 160, a controller 170, and a communication unit 180, a sensing unit 190, and a power supply unit 195.

Here, the electronic device 100 may be implemented as various devices such as a smartphone, a tablet computer, a notebook computer, a personal digital assistant (PDA), a portable multimedia player (PMP), a smart glass, a project glass, a navigation device, or a car dash cam or a car video recorder, which is an imaging device for a vehicle, and may be provided in a vehicle.

Driving-related guidance may include various guidance for assisting a driver in driving a vehicle such as route guidance, lane departure guidance, lane maintenance guidance, front vehicle departure guidance, traffic light change guidance, front vehicle collision prevention guidance, lane change guidance, lane guidance, curve guidance, etc.

Here, the route guidance may include an AR route guidance for performing route guidance by combining various information such as a user's position and direction to an image obtained by capturing a front of a running vehicle or 2-dimensional (2D) or a 3-dimensional (3D) route guidance for performing route guidance by combining various information such as a user's position and direction to 2D or 3D map data.

In addition, the route guidance may include aerial map route guidance for performing route guidance by combining various information such as a user's position and direction with the aerial map data. Here, the route guidance may be interpreted as a concept including not only a case in which a user rides in a vehicle and drives but also a case in which a user walks or jumps to move.

In addition, the lane departure guidance may guide whether a vehicle which is running has deviated from a lane marking.

In addition, the lane maintenance guidance may guide the vehicle to return to an original driving lane.

In addition, the front vehicle departure guidance may guide whether a vehicle located in front of a vehicle being stopped is departing.

In addition, the traffic light change guidance may guide whether a signal change of a traffic light located in front of the vehicle being stopped. For example, when a red traffic light indicating a stop signal is turned on and is changed to a blue traffic light indicating a start signal, this may be guided.

In addition, the front vehicle collision prevention guidance may guide to prevent a collision with the vehicle in front when a distance between a vehicle stopped or running and a vehicle located in front of the vehicle is within a predetermined distance.

In addition, the lane change guidance may guide a change from a lane in which a vehicle is located to another lane in order to guide a route to a destination.

In addition, the lane guidance may guide the lane in which the vehicle is currently located.

In addition, the curve guidance may guide that a road on which the vehicle will travel after a predetermined time is a curve.

The driving-related images, such as a front image of a vehicle that enables the provision of various guidance, may be captured by a camera mounted on the vehicle or a camera of a smart phone. Here, the camera may be a camera integrally formed with the electronic device 100 mounted on the vehicle to image the front of the vehicle.

As another example, the camera may be a camera mounted on a vehicle separately from the electronic device 100 to image the front of the vehicle. In this case, the camera may be a separate imaging device for a vehicle mounted toward the front of the vehicle and the electronic device 100 may receive a captured image through wired/wireless communication from the separately mounted imaging device for a vehicle, or when a storage medium storing the captured image of the imaging device for a vehicle is inserted into the electronic device 100, the electronic device 100 may receive the captured image.

Hereinafter, the electronic device 100 according to an exemplary embodiment of the present invention will be described in more detail based on the aforementioned contents.

The storage unit 110 functions to store various data and applications required for an operation of the electronic device 100. In particular, the storage unit 110 may store data necessary for an operation of the electronic device 100, e.g., an OS, a route search application, and map data.

In addition, the storage unit 110 may store data generated by an operation of the electronic device 100, for example, route data searched from a starting point to a destination and a received image.

The storage unit 110 may be implemented as an internal storage element such as a random access memory (RAM), a flash memory, read only memory (ROM), an erasable programmable ROM (EPROM), an electronically erasable and programmable ROM (EEPROM), a register, a hard disk, a removable disk, a memory card, a universal subscriber identity module (USIM), and a detachable storage element such as a USB memory or the like.

The input unit 120 functions to convert a physical input from the outside of the electronic device 100 into a specific electric signal. Here, the input unit 120 may include all or some of the user input unit 121 and the microphone unit 123.

The user input unit 121 may receive a user input such as a touch or a push operation. Here, the user input unit 121 may be implemented using at least one of various button types, a touch sensor receiving a touch input, and a proximity sensor receiving an approaching motion.

The microphone unit 123 may receive a user's voice and a sound generated inside and outside the vehicle.

The output unit 130 is a device that outputs data of the electronic device 100 to a user as an image and/or audio. Here, the output unit 130 may include all or some of the display unit 131 and the audio output unit 133.

The display unit 131 is a device outputting data that may be visually recognized by a user. The display unit 131 may be implemented as a display unit provided on the front of a housing of the electronic device 100. In addition, the display unit 131 may be integrally formed with the electronic device 100 to output visual recognition data and may be installed separately from the system 100 such as a head-up display (HUD) to output visual recognition data.

The audio output unit 133 is a device outputting data that may be audibly recognized by the electronic device 100. The audio output unit 133 may be implemented as a speaker expressing, as sound, data to be notified by the user of the electronic device 100.

The lane marking detecting unit 140 may perform the function of the lane marking recognizing unit 13 described above. The AR processing unit 160 may perform the functions of the AR processing devices 10 and 20 described above. That is, the AR processing unit 160 may generate an AR image displaying a driving image captured by the camera and various objects in an overlapping manner.

Meanwhile, the communication unit 180 may be provided for the electronic device 100 to communicate with other devices. The communication unit 180 may include all or some of a position data unit 181, a wireless Internet unit 183, a broadcast transceiver unit 185, a mobile communication unit 186, a short-range communication unit 187, and a wired communication unit 189.

The position data unit 181 refers to a device that acquires position data through a global navigation satellite system (GNSS). GNSS refers to a navigation system capable of calculating a position of a receiving terminal using radio signals received from satellites. Specific examples of GNSS include global positioning system (GPS), Galileo, global orbiting navigational satellite system (GLONASS), COMPASS, Indian regional navigational satellite system (IRNSS), quasi-zenith satellite system (QZSS), etc. According to operators. The position data unit 181 of the system according to an exemplary embodiment of the present invention may acquire position data upon receiving a GNSS signal provided in a region in which the electronic device 100 is used. Alternatively, the position data unit 181 may acquire position data through communication with a base station or an access point (AP) in addition to the GNSS.

The wireless Internet unit 183 is a device that acquires or transmits data by accessing the wireless Internet. The wireless internet unit 183 may access the Internet through various communication protocols defined to perform wireless data transmission and reception of wireless LAN (WLAN), wireless broadband (Wibro), world interoperability for microwave access (Wimax), and high speed downlink packet access (HSDPA).

The broadcast transceiver unit 185 is a device that transmits and receives broadcast signals through various broadcast systems. Broadcast systems that may transmit and receive through the broadcast transceiver unit 185 include digital multimedia broadcasting terrestrial (DMBT), digital multimedia broadcasting satellite (DMBS), media forward link only (MediaFLO), digital video broadcast handheld (DVBH), and integrated services digital broadcast terrestrial (ISDBT). Broadcast signals transmitted and received through the broadcast transceiver unit 185 may include traffic data, life data, and the like.

The mobile communication unit 186 may perform voice and data communication by accessing a mobile communication network according to various mobile communication standards such as 3rd generation (3G), 3rd generation partnership project (3GPP), and long term evolution (LTE).

The short-range communication unit 187 is a device for short-range communication. As described above, the short-range communication unit 187 performs communication through Bluetooth, radio frequency identification (RFID), infrared data association (IrDA), ultra wideband (UWB), ZigBee, near field communication (NFC), wireless-fidelity (Wi-Fi), etc.

The wired communication unit 189 is an interface device capable of connecting the electronic device 100 to another device by wire. The wired communication unit 189 may be a USB module capable of communicating through a USB port.

The communication unit 180 may communicate with another device using at least one of the position data unit 181, the wireless Internet unit 183, a broadcast transceiver unit 185, the mobile communication unit 186, the short-range communication unit 187, and the wired communication unit 189.

As an example, when the electronic device 100 does not include a camera function, an image captured by an imaging device for a vehicle such as a car dash cam or a car video recorder may be received using at least one of the short-range communication unit 187 and the wired communication unit 189.

As another example, in the case of communicating with a plurality of devices, one thereof may communicate with the short-range communication unit 187 and the other may communicate with the wired communication unit 119.

The sensing unit 190 is a device capable of detecting a current state of the electronic device 100. The sensing unit 190 may include all or some of a motion sensing unit 191 and a light sensing unit 193.

The motion sensing unit 191 may detect a motion of the electronic device 100 in a 3D space. The motion sensing unit 191 may include a 3-axis geomagnetic sensor and a 3-axis acceleration sensor. A trace of the vehicle to which the electronic device 100 is attached may be more accurately calculated by combining motion data acquired through the motion sensing unit 191 with position data acquired through the position data unit 181.

The light sensing unit 193 is a device that measures ambient illuminance of the system 100. Brightness of the display unit 131 may be changed to correspond to ambient brightness using illuminance data acquired through the light sensing unit 193.

The power supply unit 195 is a device that supplies power necessary for an operation of the electronic device 100 or an operation of another device connected to the electronic device 100. The power supply unit 195 may be a device that receives power from a battery built in the electronic device 100 or an external power source of a vehicle. In addition, the power supply unit 195 may be implemented as the wired communication module 119 or may be implemented as a device supplied wirelessly according to a type of receiving power.

The controller 170 controls an overall operation of the electronic device 100. Specifically, the controller 170 may control all or some of the storage unit 110, the input unit 120, the output unit 130, the AR processing unit 160, the communication unit 180, the sensing unit 190, and the power supply unit 195.

That is, the controller 170 may control the AR processing unit 160 based on a predetermined condition (e.g., the driving environment of the vehicle and/or a user input through the input unit 120) to display an AR image matching certain conditions on the display unit 131.

As an example, when a request for route guidance to a destination is input from the user through the input unit 120, the controller 170 may control the AR processing unit 160 to generate an AR image in which a captured driving image and a route guidance object are displayed in an overlapping manner, and control the display unit 131 to display the generated AR image.

Figure 11:
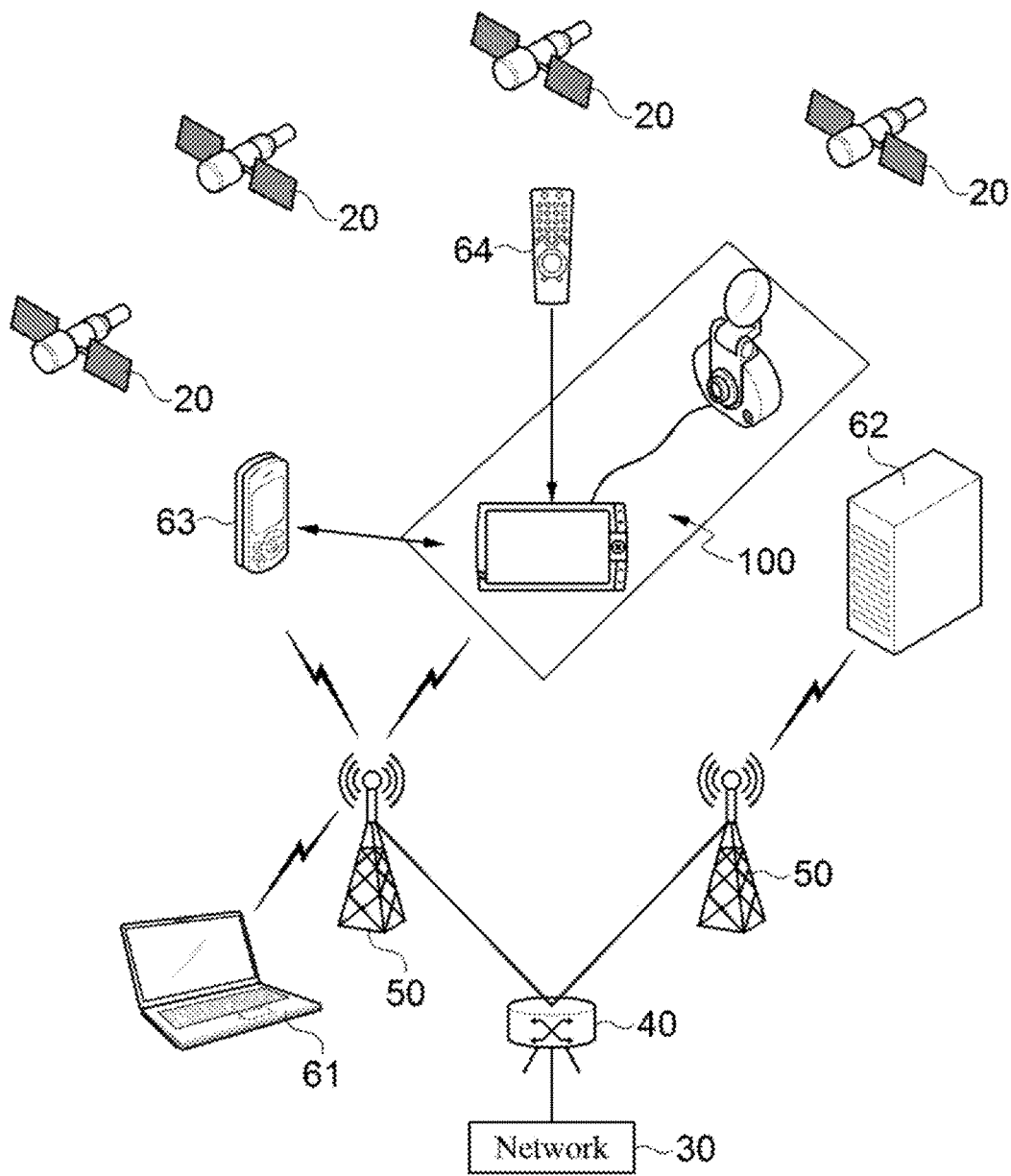
FIG. 11 is a view illustrating a system network connected to an electronic device according to an exemplary embodiment of the present invention.

FIG. 11 is a view illustrating a system network connected to an electronic device according to an exemplary embodiment of the present invention. Referring to FIG. 11, an electronic device 100 according to an exemplary embodiment of the present invention may be implemented as various devices provided in a vehicle such as a navigation device, an imaging device for a vehicle, a smartphone, or other device for providing an AR interface for a vehicle, and may be connected to various communication networks and other electronic devices 61 to 64.

In addition, the electronic device 100 may calculate a current position and a current time zone by interworking with a GPS module according to a radio signal received from a satellite 20.

Each satellite 20 may transmit an L-band frequency having a different frequency band. The device 100 may calculate a current position based on a time taken for the L-band frequency transmitted from each satellite 20 to reach the electronic device 100.

Meanwhile, the electronic device 100 may wirelessly access a network 30 through a control station (ACR) 50, a base station (RAS) 50, an access point (AP), etc. via the communication unit 180. When the electronic device 100 is connected to the network 30, the electronic device 100 may be indirectly connected with other electronic devices 61 and 62 connected to the network 30, to exchange data.

Meanwhile, the electronic device 100 may indirectly access the network 30 through another device 63 having a communication function. For example, when a module capable of accessing the network 30 is not provided in the electronic device 100, the electronic device 100 may communicate with another device 63 having a communication function through a short-range communication module or the like.

Hereinafter, an AR processing method according to an exemplary embodiment of the present invention will be described in more detail with reference to FIGS. 12 to 13.

Figure 12:
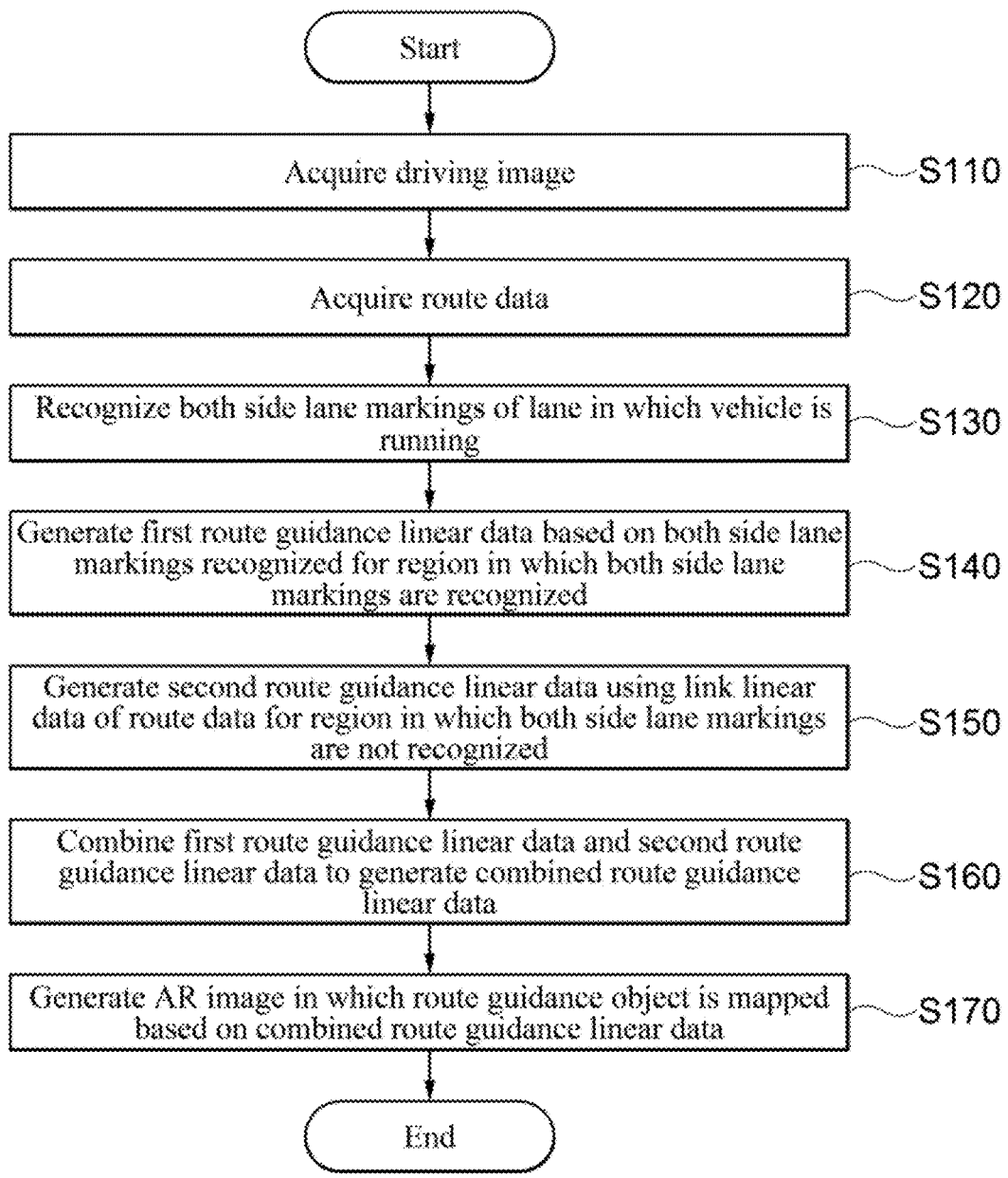
FIG. 12 is a flowchart illustrating a method of generating an AR image according to an exemplary embodiment of the present invention.

FIG. 12 is a flowchart illustrating a method for generating an AR image according to an exemplary embodiment of the present invention. Referring to FIG. 12, a driving image captured by an image capturing device of a driving vehicle may be acquired (S110). Specifically, in the acquiring operation (S110), a driving image captured by the image capturing device installed in the vehicle may be acquired in real time while the vehicle is driving.

Also, route data to a destination of the vehicle may be acquired (S120). Specifically, in the acquiring operation (S120), route data from the map data to the destination of the vehicle may be acquired. Here, the route data may include link data and node data for indicating a route to the destination of the vehicle, and the link data may include link linear data and link attribute data.

Then, both side lane markings of a lane in which the vehicle is driving may be recognized from the acquired driving image (S130). Specifically, the recognizing operation (S130) may include detecting an edge corresponding to the lane markings from the acquired driving image, generating an edge image based on the detected edge, detecting a straight line component based on the detected edge, generating an edge straight line processed image based on the detected straight line component, detecting a lane marking point corresponding to a lane marking using the generated edge image and the edge straight line processed image, and recognizing a lane marking based on the detected lane marking point. That is, in the recognizing operation (S130), both side lane markings in which the vehicle is running may be recognized by detecting a lane marking point corresponding to a left lane marking and a lane marking point corresponding to a right lane marking.

In addition, with respect to a region in which both side lane markings are recognized in the driving image, first route guidance linear data may be generated based on the recognized both side lane markings (S140). Specifically, in the generating of the first route guidance linear data, a virtual point located in the middle may be determined based on a plurality of points constituting the detected left lane marking and a plurality of points constituting a right lane marking, and first route guidance linear data may be generated by connecting virtual points.

In addition, for a region in which both side lane markings are not recognized in the driving image, second route guidance linear data may be generated using link linear data of the route data (S150). Specifically, the generating of the second route guidance linear data (S150) may include detecting link linear data corresponding to a region in which both side lane markings are not recognized based on the current position of the vehicle among the plurality of link linear data and generating second route guidance linear data based on the detected link linear data.

Here, the generating of the second route guidance linear data (S150) may include correcting a position error and an angle error.

Specifically, the generating of the second route guidance linear data (S150) may include calculating translation values of points constituting the link linear data based on a position of a first point constituting the first route guidance linear data and translating the points constituting the link linear data based on the calculated translation value.

In addition, the generating of the second route guidance linear data (S150) may further include calculating a rotation angle of the link linear data based on an angle difference between a driving direction vector of the vehicle and a route direction vector of the vehicle and rotating the link linear data according to the translation based on the calculated rotation angle.

According to the generating of the second route guidance linear data (S150), second route guidance linear data in which a position error and an angle error are corrected may be generated.

Meanwhile, if only one lane is recognized in the recognizing of a lane marking (S130), the method may further include generating a virtual lane marking for the other lane marking based on the lane marking width data, and determining a virtual point located in the middle based on the recognized one lane marking and the other virtual lane marking being virtually generated and generating route guidance linear data by connecting virtual points.

Then, combined route guidance linear data may be generated by combining the first route guidance linear data and the second route guidance linear data (S160).

Also, an AR image to which the route guidance object is mapped may be generated based on the generated combined route guidance linear data (S170). Here, the route guidance object may include a first route guidance object in the shape of an arrow and second and third route guidance objects in the shape of a carpet. The generating of the AR image (S170) will be described in more detail with reference to FIG. 13.

Meanwhile, the electronic device 100 may further perform displaying of the generated AR image.

Figure 13:
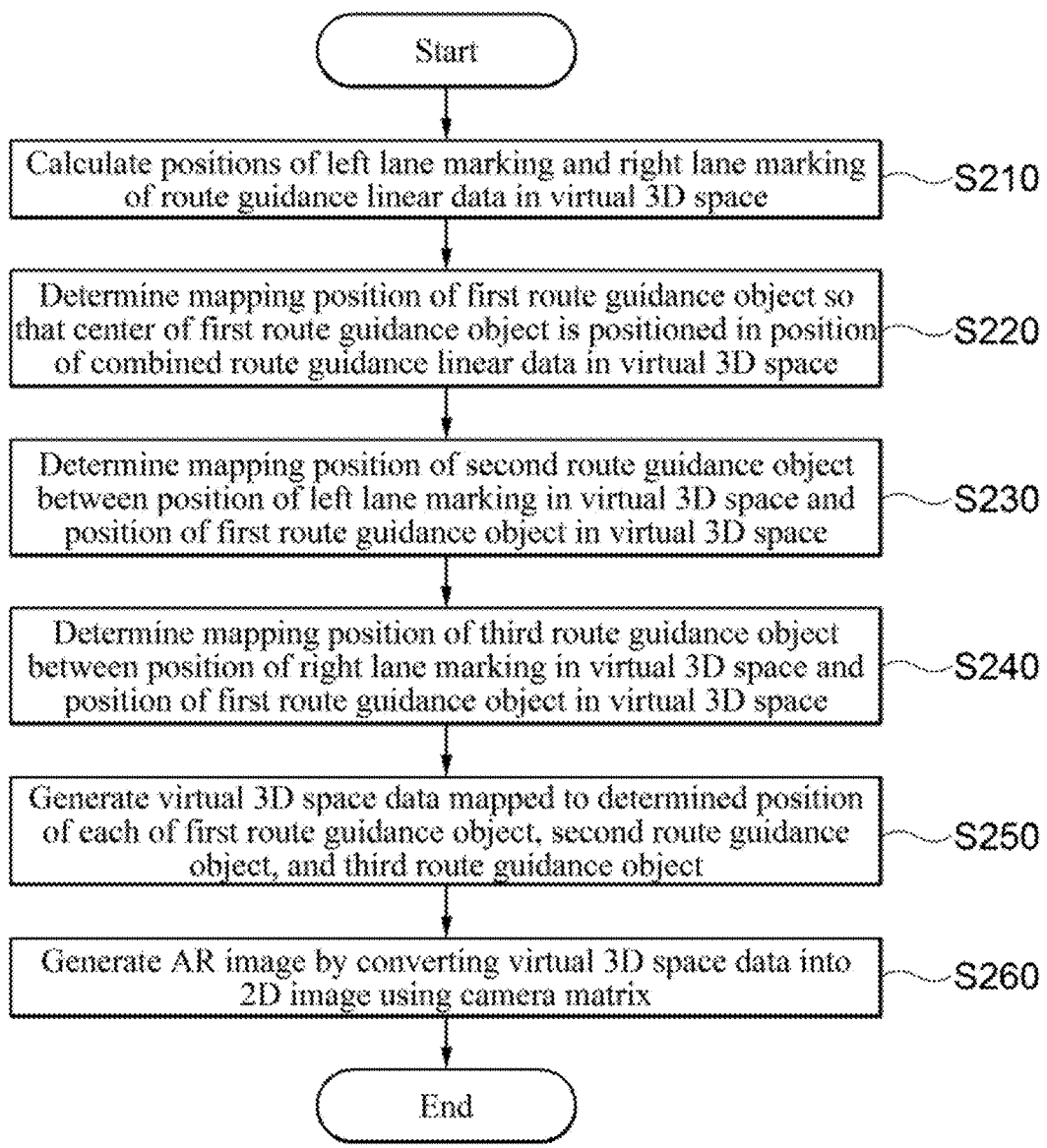
FIG. 13 is a flowchart specifically illustrating a step of generating linear data according to an exemplary embodiment of the present invention.

FIG. 13 is a flowchart specifically illustrating a linear data generating operation according to an exemplary embodiment of the present invention. Referring to FIG. 13, a position of the combined route guidance linear data generated in the generating operation (S160) in a virtual 3D space, a position of the left lane marking in the virtual 3D space, and a position of the right lane marking in the virtual 3D space may be calculated (S210).

Also, a mapping position of the first route guidance object may be determined so that the center of the first route guidance object is located at the position of the combined route guidance linear data in the virtual 3D space (S220).

Also, a mapping position of the second route guidance object may be determined between the position of the left lane marking in the virtual 3D space and the position of the first route guidance object in the virtual 3D space (S230).

Also, a mapping position of the third route guidance object may be determined between the position of the right lane marking in the virtual 3D space and the position of the first route guidance object in the virtual 3D space (S240).

Also, virtual 3D spatial data mapped to the determined mapping positions of each of the first route guidance object, the second route guidance object, and the third route guidance object may be generated (S250).

Also, virtual 3D spatial data to which the route guidance objects are mapped may be converted into a 2D image to generate an AR image using a camera matrix (S260). Accordingly, the image captured by the camera and the route guidance object may be displayed in an overlapping manner in the AR image.

Meanwhile, the AR image generating method according to an exemplary embodiment of the present invention may further include curving at least one of the both side lane markings recognized by the lane marking recognizing unit 13, the first route guidance linear data, and the second route guidance linear data.

Also, the method for generating an AR image according to an exemplary embodiment of the present invention may further include performing a filtering process on spatial coordinates in calculated 3D space during the operation of the device.

Figure 14:
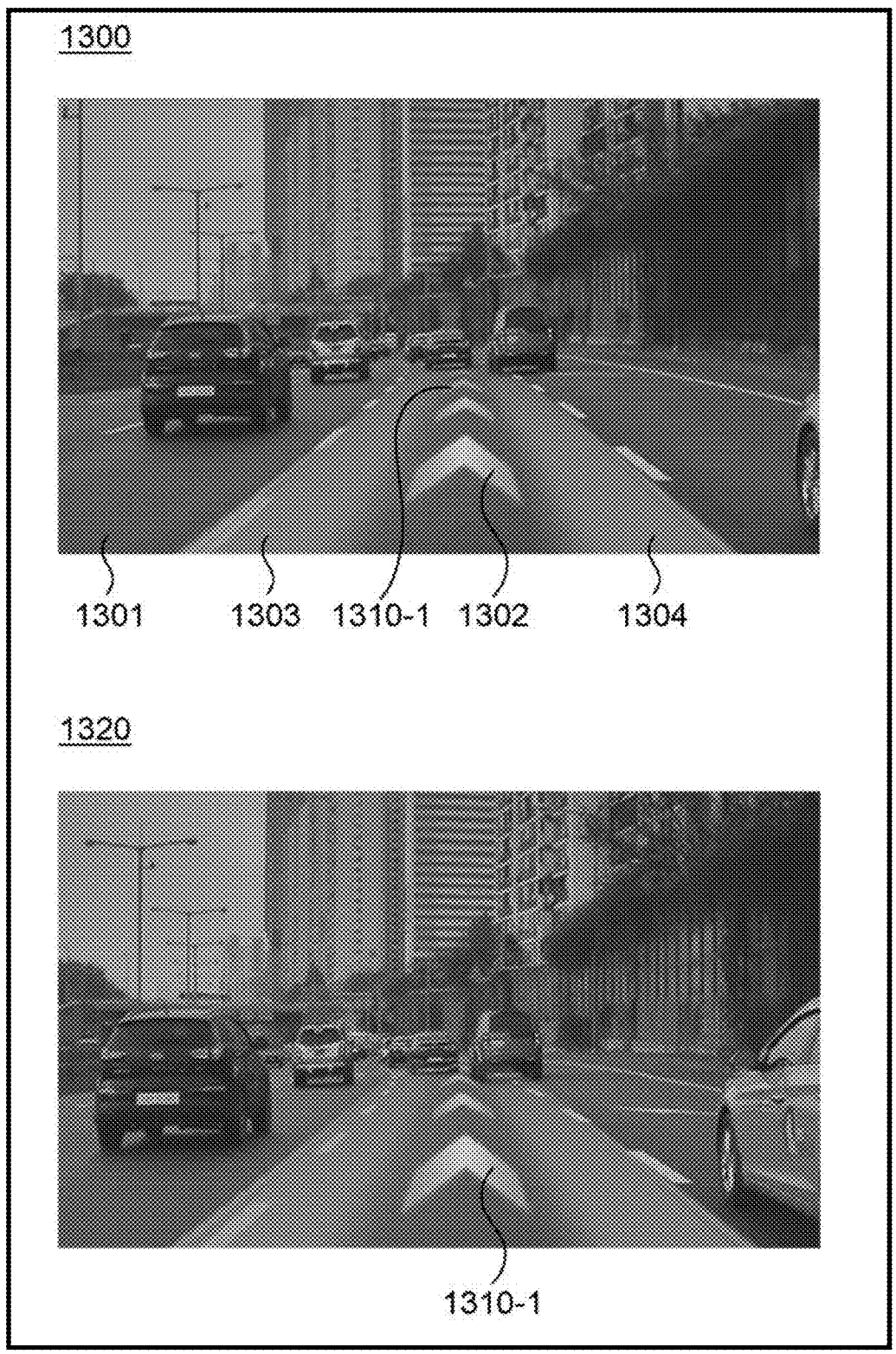
FIG. 14 is a view illustrating an AR image displayed through an electronic device when route guidance to a destination is performed.

FIG. 14 is a view illustrating an AR image displayed through an electronic device when route guidance to a destination is performed. Referring to FIG. 14, the display unit 131 of the electronic device 100 may display an AR image 1300 in which a driving image 1301 captured by a camera and route guidance objects 1302, 1303, and 1304 are overlapped.

The AR image 1300 is an AR image at a first time point, and the AR image 1320 is an AR image at a second view point after a predetermined time from the first time point.

The AR images 1300 and 1320 may include images of a front vehicle driving in front of the vehicle.

In addition, the route guidance object may include a first route guidance object 1302 displayed in an arrow shape on a lane in which the vehicle is running, a second route guidance object 1303 displayed in a rectangular shape on a lane in which the vehicle is running, and a third route guidance object 1304 displayed in a rectangular shape on a lane in which the vehicle is running.

Here, the first route guidance object 1302 may be arranged based on the combined route guidance linear data generated by the route guidance linear data generating unit 14 and displayed on the AR image 1300. In addition, the second route guidance object 1303 may be displayed between the left of the first route guidance object 1302 and a left lane marking and displayed through AR, and the third route guidance object 1304 may be disposed between the right of the first route guidance object 1302 and a right lane marking and displayed through AR.

Here, the second route guidance object 1303 and the third route guidance object 1304 may have transparency toward from the outside to the inside.

Meanwhile, the route guidance objects 1302, 1303, and 1304 may be displayed by moving from front to rear when the vehicle travels forward. That is, a first route guidance object 1310-1 displayed in the front of the vehicle in the AR image 1300 in a first view may be displayed 1310-1 to be closer to the vehicle in an AR image 1320 in a second view in which the vehicle has traveled to the front for a predetermined period of time. Also, a moving speed of the route guidance objects 1302, 1303, and 1304 may vary according to a driving speed of the vehicle.

The route guidance objects 1302, 1303, and 1304 may be displayed in blue, and the color may change or disappear under a certain condition. For example, the certain condition in which the color of the route guidance objects 1302, 1303, and 1304 changes may be a condition in which the vehicle deviates from a lane marking, and the certain condition in which the route guidance objects 1302, 1303 and 1304 disappear may be a condition in which the vehicle is close to a turn point.

According to the present invention, the first route guidance object 1302 based on a lane is moved through animation processing according to a vehicle speed, so that the object may be expressed naturally and dynamically as if it is painted on the lane.

Figure 15:
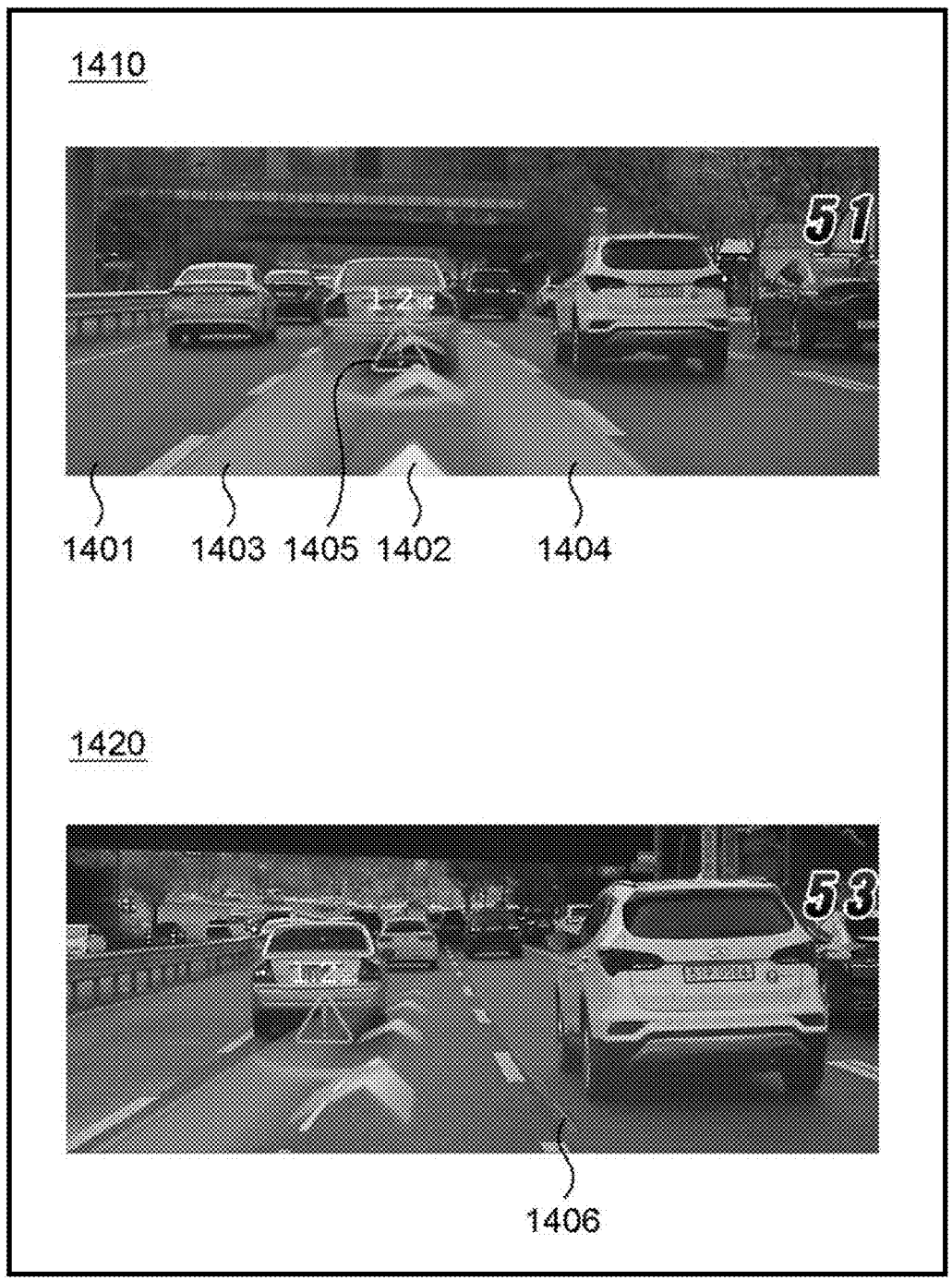
FIG. 15 is a view illustrating an AR image displayed through an electronic device when a vehicle deviates from a lane marking.

FIG. 15 is a view illustrating an AR image displayed through an electronic device when a vehicle deviates from a lane marking. An AR image 1410 is an image displayed on the electronic device 100 when a distance to a front vehicle located in front of the vehicle is narrowed to within a predetermined distance during route guidance, and an AR image 1420 is an image displayed on the electronic device 100 when the vehicle deviates from the lane marking after a predetermined period of time from the image 1410.

The display unit 131 of the electronic device 100 may display AR images 1410 and 1420 in which the driving image 1401 captured by the camera and the route guidance objects 1402, 1403, and 1404 are superimposed.

First, when a distance to a front vehicle located in front of the vehicle is reduced to within a predetermined distance during route guidance, the electronic device 100 may display an AR image 1410 including route guidance objects 1402, 1403, and 1404 and a front vehicle collision avoidance guidance object 1405. Here, the front vehicle collision avoidance guidance object 1405 may be displayed in an image region of the front vehicle and may display a collision time with the front vehicle.

Thereafter, when the vehicle deviates from the lane marking, the electronic device 100 may change and display a display state of at least one of the second route guidance object 1403 and the third route guidance object 1404. Specifically, the electronic device 100 may change colors of the second route guidance object 1403 and the third route guidance object 1404 from blue to red, and blinks the third route guidance object 1404 corresponding to the lane marking from which the vehicle deviates. The third route guidance object 1404 is not displayed in the AR image 1420 because it is an image captured in an OFF state changed from an ON state.

Meanwhile, in this case, the color of the first route guidance object 1402 may be maintained as blue.

In addition, the electronic device 100 may display an AR image 1420 including a lane departure guidance object 1406 corresponding to the lane marking from which the vehicle deviates.

Figure 16:
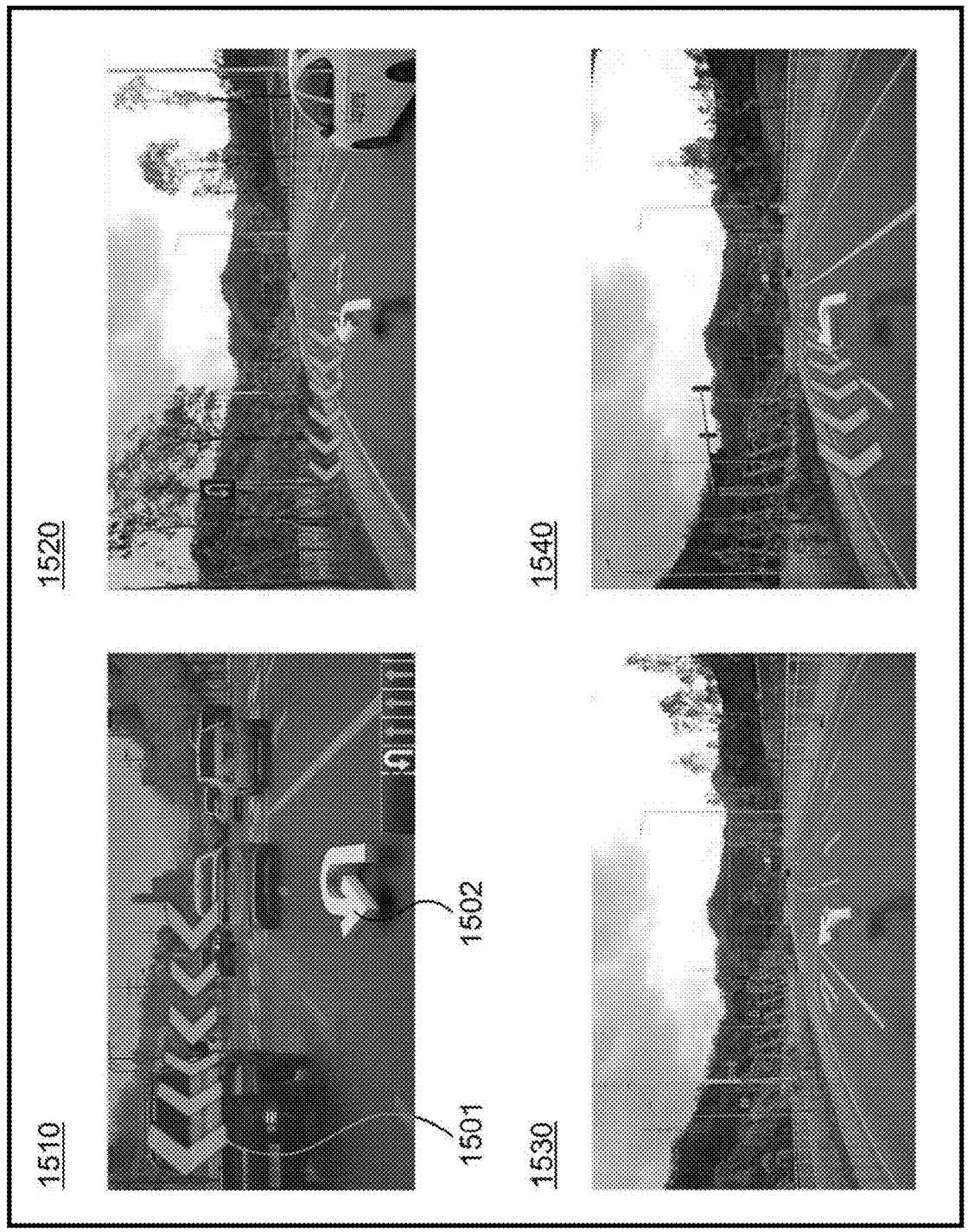
FIGS. 16 to 17 are views illustrating AR images displayed through an electronic device when a vehicle approaches a turn point.
Figure 17:
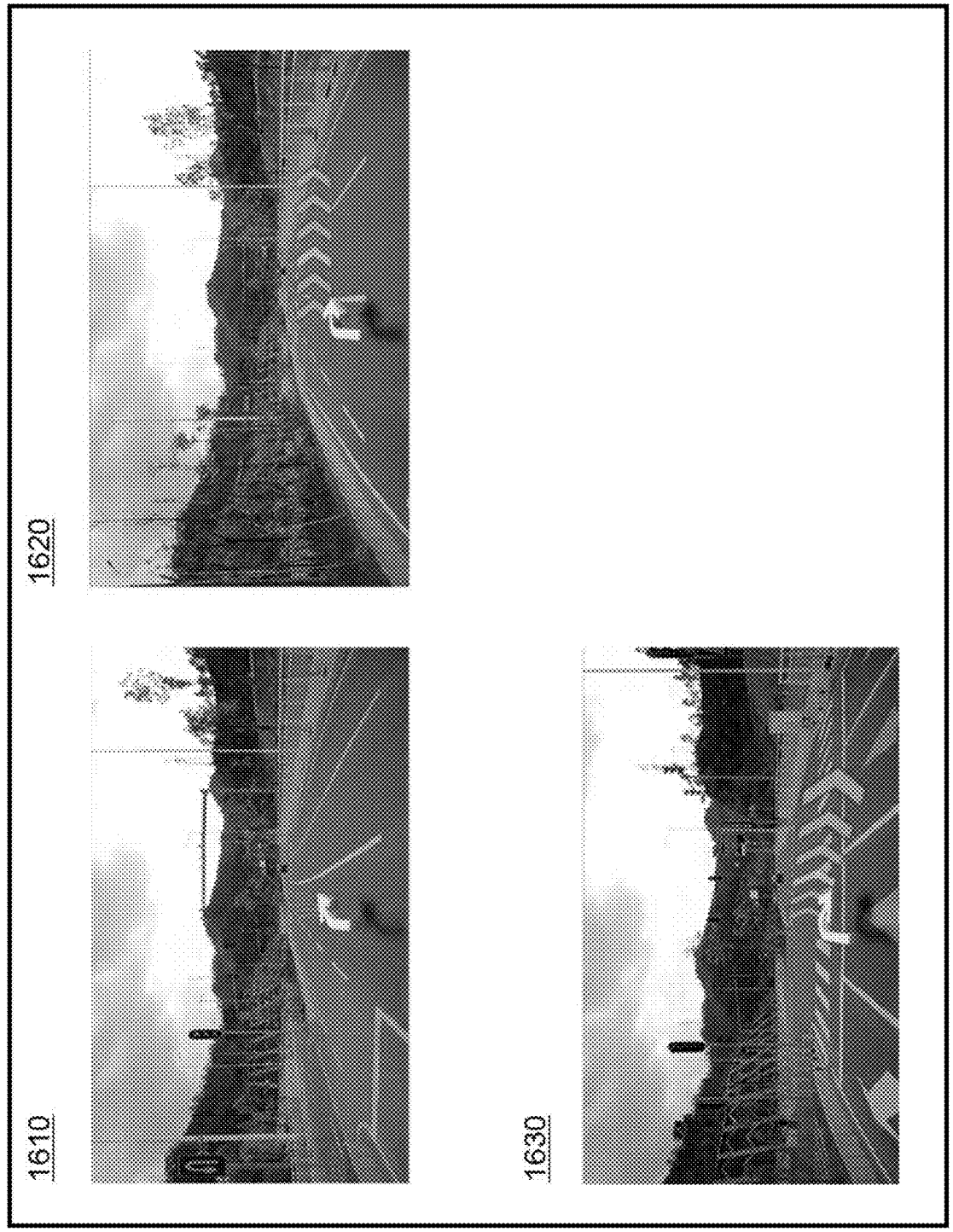

FIGS. 16 to 17 are views illustrating AR images displayed through an electronic device when a vehicle approaches a turn point. Referring to FIGS. 16 to 17, when the vehicle approaches a turn point (U-turn, left turn, right turn, etc.) where the vehicle needs to change a driving direction, the electronic device 100 may delete the route guidance object and display an AR image including only a turn point guidance object. Here, the turn point guidance object may include a first turn point guidance object 1501 that guides a driving direction at the turn point with vertically arranged arrows and a second turn point guidance object 1502 that guides the driving direction at the turn point with an animation bouncing up and down.

For example, when the vehicle approaches the U-turn point, the electronic device 100 may display the AR image 1510. Also, when the vehicle approaches a left turn point, the electronic device 100 may display an AR image 1520, 1530, or 1540 according to the left turn direction. Also, when the vehicle approaches a right turn point, the electronic device 100 may display an AR image 1610, 1620, or 1630 according to the left turn direction.

According to the present invention, when the vehicle approaches the turn point, the route guidance object may be deleted and the turn point guidance object may be displayed, so that the user may clearly recognize the turn point information.

Figure 18:
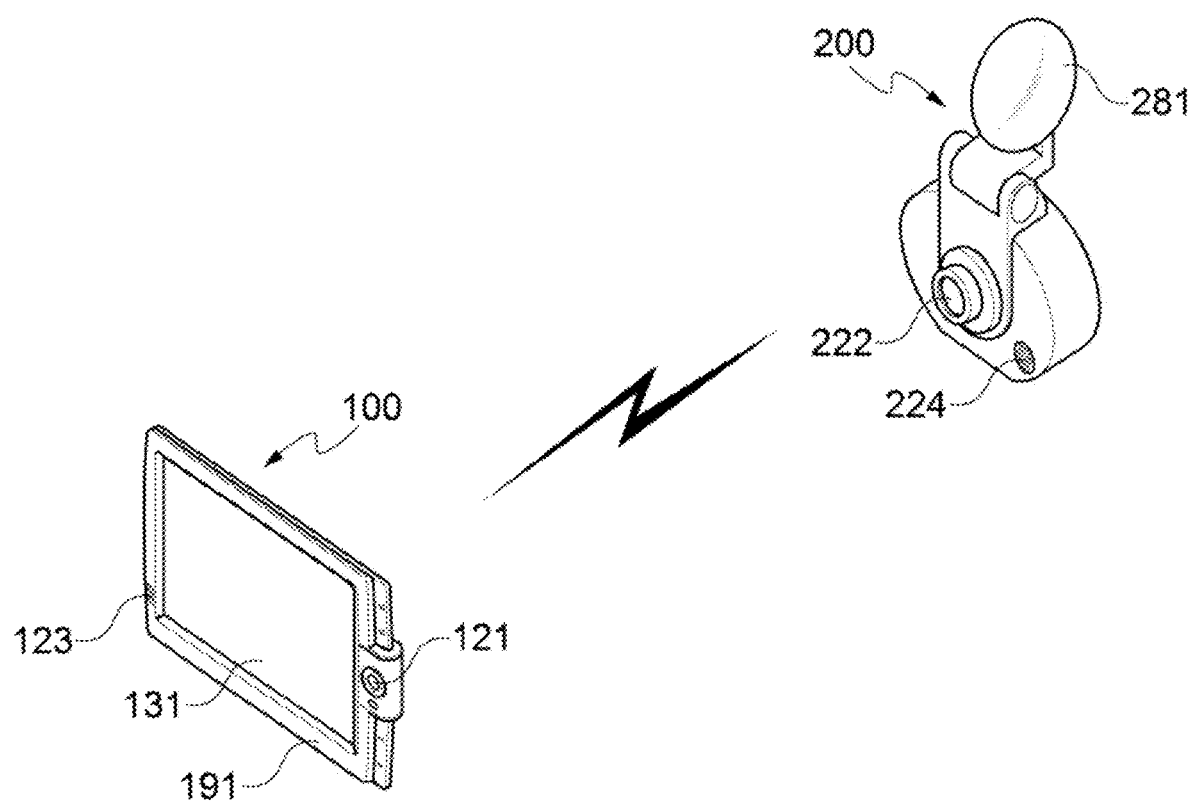
FIG. 18 is a view illustrating an implementation form when an electronic device does not include an image capturing unit according to an exemplary embodiment of the present invention.

FIG. 18 is a view illustrating an implementation form when an electronic device according to an exemplary embodiment of the present invention does not include an imaging unit. Referring to FIG. 18, an image recording device 200 for a vehicle provided separately from the electronic device 100 for a vehicle may configure a system according to an exemplary embodiment of the present invention using a wired/wireless communication method.

The electronic device 100 for a vehicle may include a display unit 131 provided on a front surface of a housing 191, an operation key 121, and a microphone 123.

The image recording device 200 for a vehicle may include a camera 222 as an image acquiring device, a microphone 224, and an attaching part 281.

Figure 19:
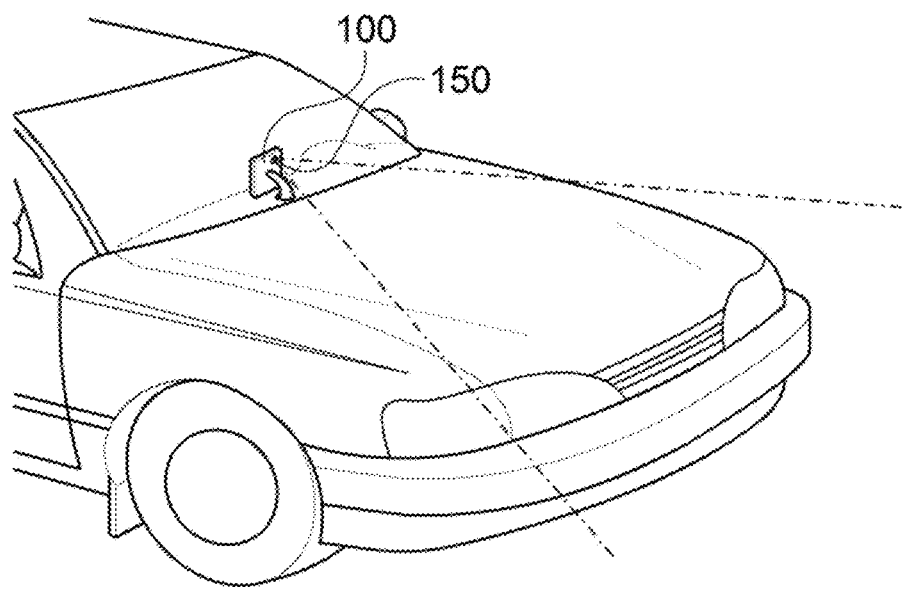
FIG. 19 is a view illustrating an implementation form when an electronic device includes an image capturing unit according to an exemplary embodiment of the present invention.

FIG. 19 is a view illustrating an implementation form when an electronic device according to an exemplary embodiment of the present invention includes an imaging unit. Referring to FIG. 19, when the electronic device 100 includes an imaging unit 150, the imaging unit 150 of the electronic device 100 may image a front of a vehicle and a display part of the electronic device 100 may allow the user to recognize the image. Accordingly, a system according to an exemplary embodiment of the present invention may be implemented.

Figure 20:
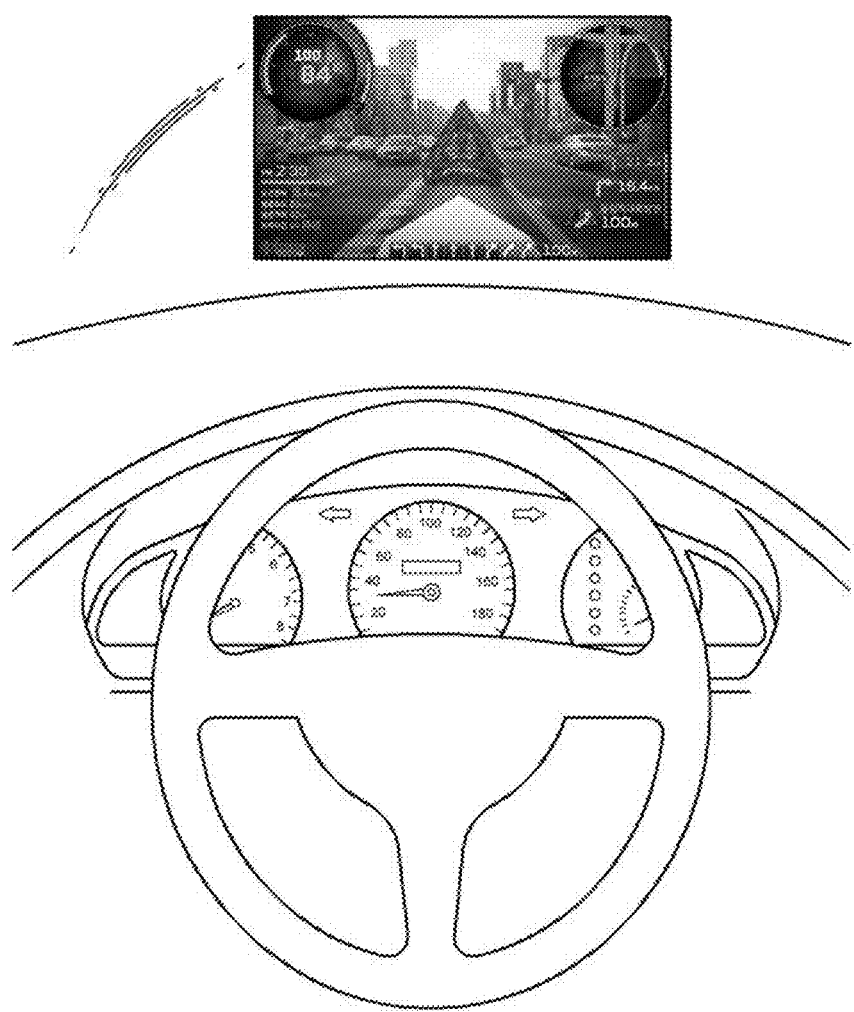
FIG. 20 is a view illustrating an implementation form using a head-up display (HUD) according to an exemplary embodiment of the present invention.

FIG. 20 is a diagram illustrating an implementation form using a head-up display (HUD) according to an exemplary embodiment of the present invention. Referring to FIG. 20, the HUD may display an AR guidance screen on a head-up display through wired/wireless communication with other devices.

For example, the AR may be provided through a HUD using a vehicle windshield or image overlay using a separate image output device, and the AR processing unit 160 may generate an interface image overlaid on a real image or glass. Through this, an AR navigation or vehicle infotainment system may be implemented.

According to the various exemplary embodiments of the present invention described so far, a route guidance object may be displayed based on the result of recognizing the lane markings on both sides of a lane in which the vehicle is running, and in case of a long distance where a lane marking is deleted or not visible, a route guidance object may be displayed using route data stored in the storage unit, thereby more accurately display the route guidance object on the AR.

Also, according to various exemplary embodiments of the present disclosure, a dynamic route guidance object that the driver may intuitively recognize may be displayed on the AR.

In addition, according to various exemplary embodiments of the present disclosure, when a lane departure occurs while the vehicle is running, the route guidance object and the lane departure guidance object may be intuitively displayed on the AR.

Meanwhile, at least one or more of the modules constituting the AR processing device 10 and the electronic device 100 according to the present invention may be implemented as one module of a system for autonomous driving to perform a route guidance function. This will be described in more detail with reference to FIGS. 21 and 22.

Figure 21:
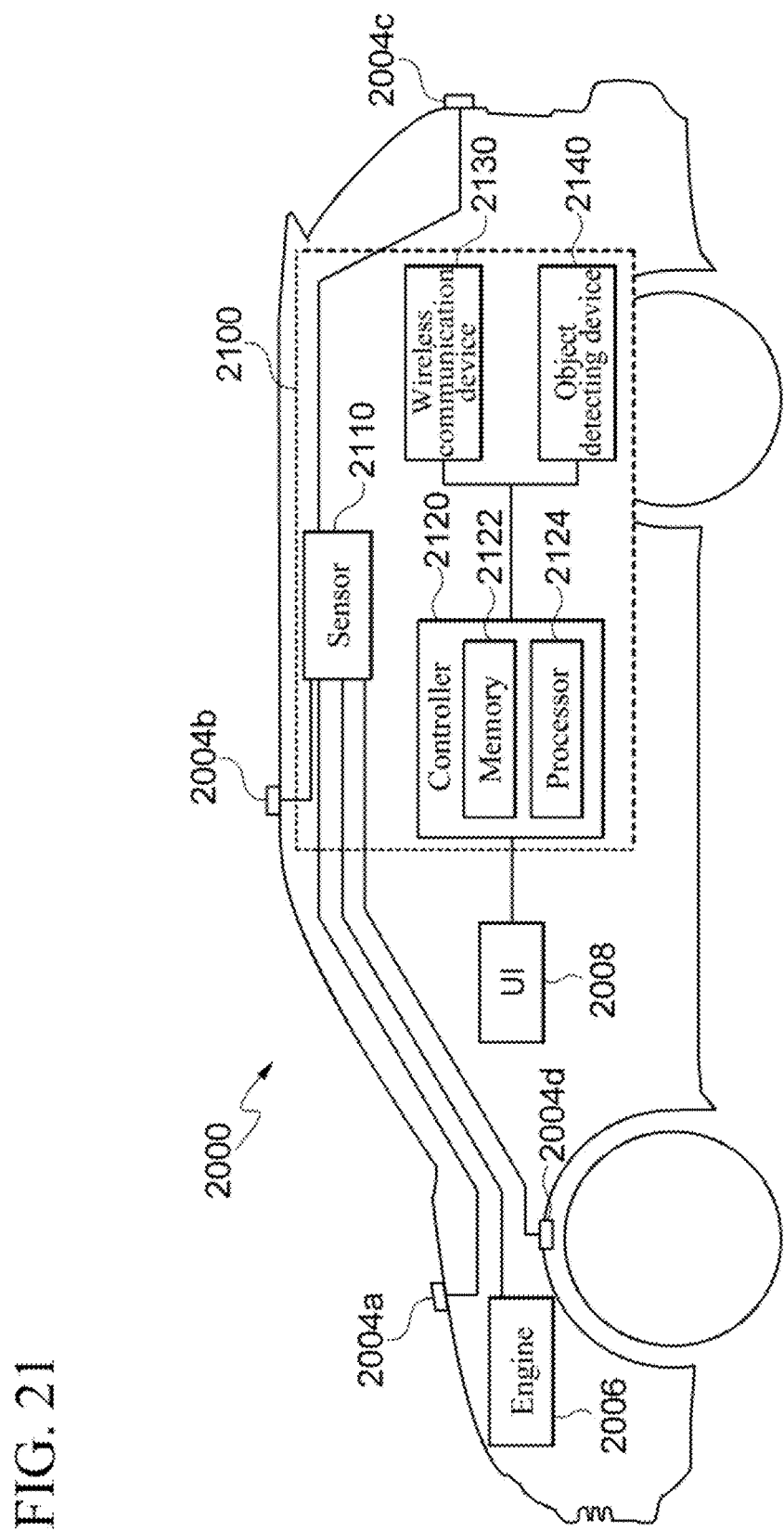
FIG. 21 is a block diagram illustrating an autonomous driving system according to an exemplary embodiment of the present invention.

Referring to FIG. 21, an autonomous vehicle 2000 according to the present exemplary embodiment includes a control device 2100, sensing modules 2004*a*, 2004*b*, 2004*c*, and 2004*d*, an engine 2006, and a user interface 2008.

The autonomous vehicle 2000 may have an autonomous driving mode or a manual mode. For example, the autonomous vehicle 2000 may be switched from the manual mode to the autonomous driving mode or from the autonomous driving mode to the manual mode according to a user input received through the user interface 2008.

When the vehicle 2000 is operated in the autonomous driving mode, the autonomous vehicle 2000 may be operated under the control of the control device 2100.

In this exemplary embodiment, the control device 2100 may include a controller 2120 including a memory 2122 and a processor 2124, a sensor 2110, a communication device 2130, and an object detecting device 2140.

In this exemplary embodiment, the object detecting device 2140 is a device for detecting an object located outside the vehicle 2000, and the object detecting device 2140 may detect an object located outside the vehicle 2000 and generate object information according to a detection result.

The object information may include information on the presence or absence of an object, position information of the object, distance information between the vehicle and the object, and relative speed information between the vehicle and the object.

The object may include various objects located outside the vehicle 2000 such as lane markings, other vehicles, pedestrians, traffic signals, light, roads, structures, speed bumps, terrain objects, animals, and the like. Here, the traffic signal may be a concept including a traffic light, a traffic sign, or a pattern or text drawn on a road surface. In addition, light may be light generated from a lamp provided in another vehicle, light generated from a street lamp, or sunlight.

The structure may be an object located around a road and fixed to the ground. For example, the structure may include street lights, street trees, buildings, power poles, traffic lights, and bridges. The terrain objects may include mountains, hills, and the like.

The object detecting device 2140 may include a camera module. The controller 2120 may extract object information from an external image captured by the camera module and cause the controller 2120 to process the information.

In addition, the object detecting device 2140 may further include imaging devices for recognizing an external environment. In addition to LIDAR, RADAR, GPS device, odometry, and other computer vision devices, ultrasonic sensors, and infrared sensors may be used, and these devices may be selectively or simultaneously operated as necessary to enable more precise detection.

In addition, the sensor 2110 may be connected to the sensing modules 2004*a*, 2004*b*, 2004*c*, and 2004*d* to acquire various kinds of sensing information on a vehicle internal/external environment. Here, the sensor 2110 may include a posture sensor (e.g., a yaw sensor, a roll sensor, or a pitch sensor), a collision sensor, a wheel sensor, a speed sensor, an inclination sensor, a weight detection sensor, a heading sensor, a gyro sensor, a position module, a vehicle forward/reverse sensor, a battery sensor, a fuel sensor, a tire sensor, a steering sensor based on handle rotation, a vehicle internal temperature sensor, a vehicle internal humidity sensor, an ultrasonic sensor, an illuminance sensor, an accelerator pedal position sensor, a brake pedal position sensor, and the like.

Accordingly, the sensor 2110 may acquire vehicle posture information, vehicle collision information, vehicle direction information, vehicle position information (GPS information), vehicle angle information, vehicle speed information, vehicle acceleration information, vehicle inclination information, vehicle advance/reverse information, battery information, fuel information, tire information, vehicle lamp information, vehicle internal temperature information, vehicle internal humidity information, steering wheel rotation angle, vehicle external illumination, and a sensing signal for pressure applied to an accelerator pedal, pressure applied to a brake pedal, etc.

In addition, the sensor 2110 may further include an accelerator pedal sensor, a pressure sensor, an engine speed sensor, air flow sensor (AFS), an intake air temperature sensor (ATS), water temperature sensor (WTS), a throttle position sensor (TPS), a TDC sensor, a crank angle sensor (CAS), and the like.

In this manner, the sensor 2110 may generate vehicle state information based on sensing data.

The wireless communication device 2130 is configured to implement wireless communication between the autonomous vehicles 2000. For example, the autonomous vehicle 2000 may communicate with a user's mobile phone, another wireless communication device 2130, another vehicle, a central device (a traffic control device), a server, and the like. The wireless communication device 2130 may transmit and receive wireless signals according to wireless communication protocols. The wireless communication protocols may be Wi-Fi, Bluetooth, long-term evolution (LTE), code division multiple access (CDMA), wideband code division multiple access (WCDMA), global systems for mobile communications (GSM), but are not limited thereto.

In addition, in the present exemplary embodiment, the autonomous vehicle 2000 may implement vehicle-to-vehicle communication through the wireless communication device 2130. That is, the wireless communication device 2130 may communicate with another vehicle and other vehicles on the road through vehicle-to-vehicle communication (V2V). The autonomous vehicle 2000 may transmit and receive information such as driving warning and traffic information through V2V communication and may request information or receive a request from another vehicle. For example, the wireless communication device 2130 may perform V2V communication with a dedicated short-range communication (DSRC) device or a cellular-V2V (C-V2V) device. In addition, in addition to V2V communication, communication between the vehicle and other objects (vehicle to everything communication (V2X)) (e.g., electronic devices carried by pedestrians) may be implemented through the wireless communication device 2130.

In this exemplary embodiment, the controller 2120 is a unit that controls an overall operation of each unit in the vehicle 2000 and may be configured at the time of manufacturing by a manufacturer of the vehicle or additionally configured to perform a function of autonomous driving after manufacturing. Alternatively, a component for continuously performing an additional function may be included through upgrading of the controller 2120 configured at the time of manufacturing. The controller 2120 may also be referred to as an electronic controller (ECU).

The controller 2120 may collect various data from the connected sensor 2110, the object detecting device 2140, the communication device 2130, etc. And transfer a control signal to other components in the vehicle such as the sensor 2110, the engine 2006, the user interface 2008, the communication device 2130, and the object detecting device 2140, based on the collected data. In addition, although not shown, the control signal may also be transmitted to an acceleration device, a braking system, a steering device, or a navigation device related to driving of the vehicle.

In this exemplary embodiment, the controller 2120 may control the engine 2006. For example, the controller 2120 may detect a speed limit of a road on which the autonomous vehicle 2000 is running and control the engine 2006 so that a driving speed of the vehicle does not exceed the speed limit or control the engine 2006 to accelerate a driving speed of the autonomous vehicle 2000 within a range not exceeding the speed limit.

In addition, if the autonomous vehicle 2000 approaches or leaves a lane marking during driving, the controller 2120 may determine whether such lane marking proximity and or departure is according to a normal driving situation or whether it is according to other driving conditions, and control the engine 2006 to control driving of the vehicle according to a determination result. Specifically, the autonomous vehicle 2000 may be equipped with a lane marking detecting apparatus 10 according to an exemplary embodiment of the present invention, and the lane marking detecting apparatus 10 may detect lane markings formed on both sides of a lane in which the vehicle is running. In this case, the controller 2120 may determine whether the autonomous vehicle 2000 is approaching or leaving the lane marking, and if it is determined that the autonomous vehicle 2000 is approaching or leaving the lane marking, the controller 2120 may determine whether such driving is based on an accurate driving situation or other driving situations. Here, an example of a normal driving situation may be a situation in which the vehicle needs to change lanes. In addition, an example of other driving situations may be a situation in which the vehicle does not need to change lanes. If it is determined that the autonomous vehicle 2000 is approaching or leaving the lane marking in a situation in which the vehicle does not need to change lanes, the controller 2120 may control the autonomous vehicle 2000 to normally run without departing the lane marking.

The lane marking detecting apparatus 10 may be configured as a module in the control device 2100 of the autonomous vehicle 2000. That is, the memory 2122 and the processor 2124 of the control device 2100 may implement the lane detecting method according to the present invention in software.

When another vehicle or an obstacle is present in front of the vehicle, the controller 2120 may control the engine 2006 or a braking system to decelerate the driving vehicle, and may control a trace, a driving route, and a steering angle, in addition to the speed. Alternatively, the controller 2120 may control the driving of the vehicle by generating a necessary control signal according to recognition information of other external environments such as a lane of the driving vehicle and a driving signal.

In addition to generating a control signal of its own, the controller 2120 may perform communication with a nearby vehicle or a central server and transmit a command to control peripheral devices through received information, thereby controlling the driving of the vehicle.

In addition, it may be difficult to accurately recognize a vehicle or a lane marking if a position of the camera module is changed or an angle of view is changed. In order to prevent this, the controller 2120 may generate a control signal to perform calibration of the camera module. Accordingly, in this exemplary embodiment, since the controller 2120 generates a calibration control signal to the camera module, even if a mounting position of the camera module is changed due to vibration or impact that occurs due to movement of the autonomous vehicle 2000, a normal mounting position, direction, and angle of view of the camera module may be continuously maintained. If an initial mounting position, direction, and angle of view information of the camera module stored in advance and an initial mounting position, direction, and angle of view information of the camera module measured during the driving of the autonomous vehicle 2000 are changed by a threshold value or more, the controller 2120 may generate a control signal to calibrate the camera module.

In this exemplary embodiment, the controller 2120 may include the memory 2122 and the processor 2124. The processor 2124 may execute software stored in the memory 2122 according to a control signal from the controller 2120. Specifically, the controller 2120 may store data and instructions for performing the lane marking detecting method according to the present invention in the memory 2122, and the instructions may be executed by the processor 2124 to implement one or more methods disclosed herein.

In this case, the memory 2122 may be stored in a recording medium executable by the nonvolatile processor 2124. The memory 2122 may store software and data through an appropriate internal or external device. The memory 2122 may be configured as a memory device connected to a random access memory (RAM), a read only memory (ROM), a hard disk, and a dongle.

The memory 2122 may store at least an operating system (OS), a user application, and executable instructions. The memory 2122 may also store application data and array data structures.

The processor 2124, as a microprocessor or a suitable electronic processor, may be a controller, a microcontroller, or a state machine.

The processor 2124 may be implemented as a combination of computing devices, and the computing device may be configured as a digital signal processor, a microprocessor, or a suitable combination thereof.

Meanwhile, the autonomous vehicle 2000 may further include the user interface 2008 for user inputting for the control device 2100 described above. The user interface 2008 may allow a user to input information through appropriate interaction. For example, the user interface 2008 may be implemented as a touch screen, a keypad, and an operation button. The user interface 2008 may transmit an input or command to the controller 2120, and the controller 2120 may perform a vehicle control operation in response to the input or command.

In addition, the user interface 2008 may allow a device outside the autonomous vehicle 2000 to communicate with the autonomous vehicle 2000 through the wireless communication device 2130. For example, the user interface 2008 may interwork with a mobile phone, a tablet, or other computer devices.

Furthermore, in the present exemplary embodiment, the autonomous vehicle 2000 has been described as including the engine 2006, but the autonomous vehicle 2000 may include other types of propulsion systems. For example, a vehicle may be driven by electric energy and may be driven by hydrogen energy or a hybrid system combining them. Accordingly, the controller 2120 may include a propulsion mechanism according to a propulsion system of the autonomous vehicle 2000 and provide a control signal according to the propulsion system to components of each propulsion mechanism.

Figure 22:
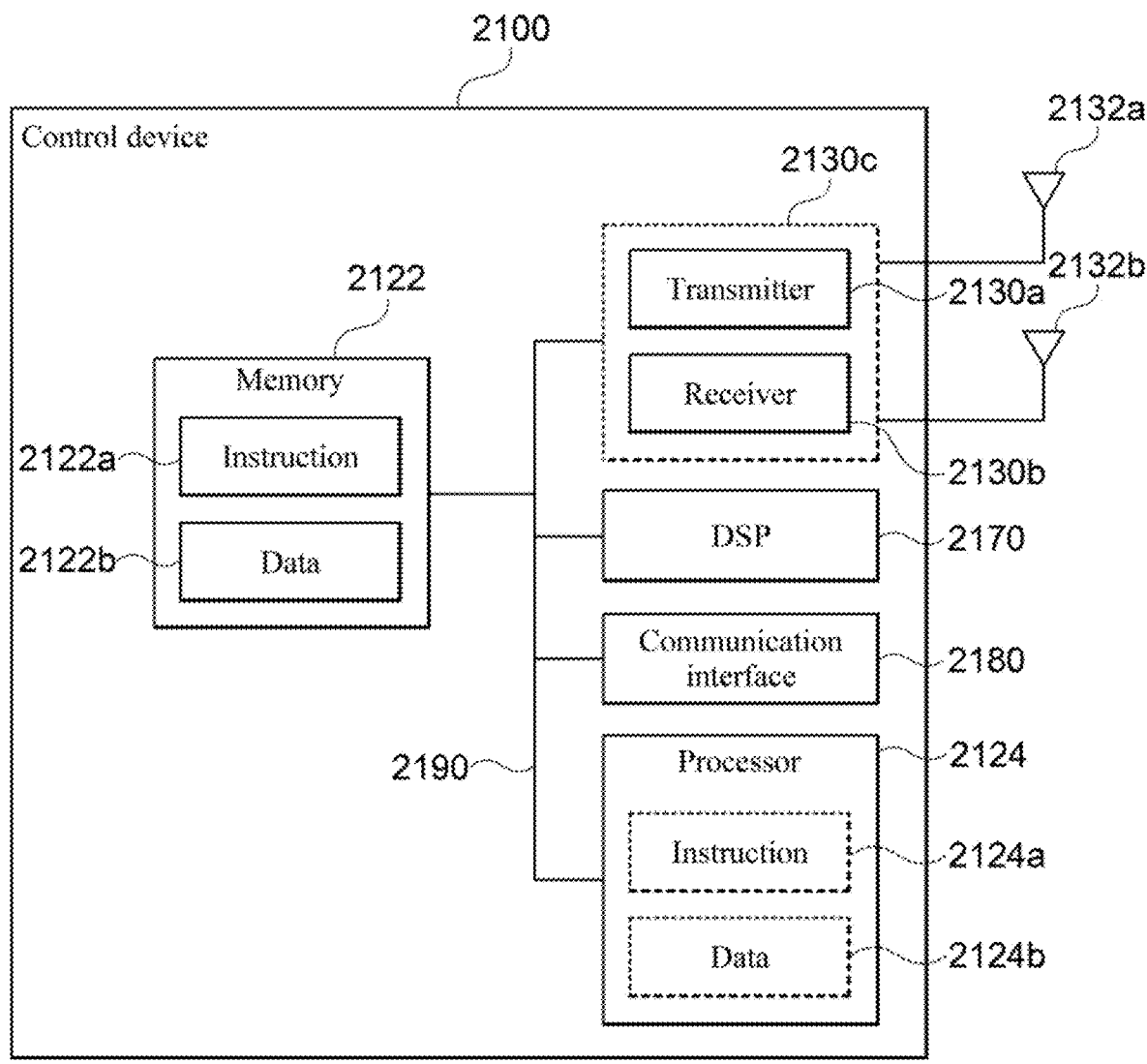
FIG. 22 is a block diagram illustrating a configuration of an autonomous vehicle according to an exemplary embodiment of the present invention.

Hereinafter, a detailed configuration of the control device 2100 for performing the lane marking detecting method according to a present exemplary embodiment will be described in more detail with reference to FIG. 22.

The control device 2100 includes a processor 2124. The processor 2124 may be a general purpose single or multi-chip microprocessor, a dedicated microprocessor, a microcontroller, a programmable gate array, or the like. The processor may also be referred to as a central processing unit (CPU). In addition, in the present exemplary embodiment, the processor 2124 may be used as a combination of a plurality of processors.

The control device 2100 also includes the memory 2122. The memory 2122 may be any electronic component capable of storing electronic information. The memory 2122 may also include a combination of memories 2122 in addition to a single memory.

Data and instructions 2122a for performing the lane marking detecting method according to the present invention may be stored in the memory 2122. When the processor 2124 executes the instructions 2122a, all or some of the instructions 2122a and data 2122b required for execution of the instructions 2124a and 2124b may be loaded onto the processor 2124.

The control device 2100 may include a transmitter 2130a, a receiver 2130b, or a transceiver 2130c for allowing transmission and reception of signals. One or more antennas 2132a and 2132b may be electrically connected to the transmitter 2130a, the receiver 2130b, or each transceiver 2130c, and may additionally include antennas.

The control device 2100 may include a digital signal processor (DSP) 2170. A digital signal may be quickly processed by the vehicle through the DSP 2170.

The control device 2100 may also include a communication interface 2180. The communication interface 2180 may include one or more ports and/or communication modules for connecting other devices to the control device 2100. The communication interface 2180 may allow a user and the control device 2100 to interact with each other.

Various components of the control device 2100 may be connected together by one or more buses 2190, and the buses 2190 may include a power bus, a control signal bus, a state signal bus, a data bus, and the like. Under the control of the processor 2124, the components may transmit mutual information through the bus 2190 and perform a desired function.

According to various exemplary embodiments of the present disclosure, a route guidance object may be displayed based on the result of recognizing the lane markings on both sides of a driving lane of a vehicle, and at a long distance where the lane is not erased or not visible, a route guidance object is displayed using route data stored in a storage unit, thereby more accurately displaying a route guidance object on an AR.

According to various exemplary embodiments of the present disclosure, a dynamic route guidance object that a driver may intuitively recognize may be displayed on AR.

According to various exemplary embodiments of the present disclosure, when a lane departure occurs while driving a vehicle, a route guidance object and a lane departure guidance object may be intuitively displayed on the AR.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. The terms used as such will be understood by the exemplary embodiments of the invention described herein. Likewise, in the case in which it is described herein that a method includes a series of steps, a sequence of the steps suggested herein is not necessarily a sequence in which the steps may be executed, and any described step may be omitted and/or any other steps that are not described herein may be added to the method. For example, the first component may be referred to as a second component, and similarly, the second component may be referred to as a first component, without departing from the scope of the present invention.

In addition, in the specification and the claims, terms such as "left", "right", "front", "rear", "top", "bottom", "over", "under", and the like do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. The term "connected" as used herein is defined as being connected directly or indirectly in an electrical or non-electrical manner. Here, targets described as being "adjacent to" each other may physically contact each other, be close to each other, or be in the same general range or region, in a context in which the above phrase is used. Here, the presence of phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

Meanwhile, when it is mentioned that any component is "directly coupled" or "directly connected" to another component, it is to be understood that any component may be coupled or connected to the other element without another component interposed therebetween.

In addition, terms "module" and "unit" for components used in the present specification are used only in order to easily make the specification. Therefore, these terms do not have meanings or roles that distinguish from each other in themselves.

In addition, the terms used in the present specification are for explaining exemplary embodiments rather than limiting the present invention. The singular expression used in the present specification includes the plural expression unless the context clearly indicates otherwise. In the specification, it is to be noted that the terms "comprising" or "including", and the like, are not be construed as necessarily including several components or several steps described in the specification and some of the above components or steps may not be included or additional components or steps are construed as being further included.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the method according to various exemplary embodiments of the present invention described above may be implemented as programs and be provided to servers or devices. Therefore, the respective apparatuses may access the servers or the devices in which the programs are stored to download the programs.

In addition, the method according to various exemplary embodiments of the present invention described above may be implemented as a program and stored in various non-transitory computer readable media and provided. The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. An augmented reality (AR)-based route guidance method using a processor, the AR-based route guidance method comprising:
   acquiring a driving image captured by an image capturing device of a vehicle which is running;
   acquiring route data to a destination of the vehicle;

recognizing both side lane markings of a lane in which the vehicle is running from the acquired driving image;

generating first route guidance linear data based on the recognized the both side lane markings for a region in which the both side lane markings are recognized in the driving image;

generating second route guidance linear data using link linear data of the route data for a region in which the both side lane markings are not recognized in the driving image;

combining the first route guidance linear data and the second route guidance linear data to generate combined route guidance linear data; and displaying a route guidance object in AR image by determining a mapping position of the route guidance object based on the generated combined route guidance linear data, wherein the generating the second route guidance linear data includes detecting the link linear data corresponding to a region in which the both side lane markings are not recognized based on a current position of the vehicle among a plurality of link linear data and generating the second route guidance linear data based on the detected link linear data.

2. The AR-based route guidance method of claim 1, wherein the generating of the second route guidance linear data includes:

calculating a translation value of points constituting the link linear data based on a position of a first point constituting the first route guidance linear data; and translating points constituting the link linear data based on the calculated translation value.

3. The AR-based route guidance method of claim 2, wherein the generating of the second route guidance linear data further includes:

calculating a rotation angle of the link linear data based on a difference in angle between a driving direction vector of the vehicle and a route direction vector of the vehicle; and rotating the link linear data according to translation based on the calculated rotation angle.

4. The AR-based route guidance method of claim 1, further comprising:

when only one side lane marking is recognized in the driving image, generating a virtual lane marking for the other side lane marking based on lane marking width data.

5. The AR-based route guidance method of claim 1, wherein the route guidance object includes:

a first route guidance object having a center in the combined route guidance linear data and having an arrow shape indicating a route along which the vehicle is to run;

a second route guidance object indicated between a left side of the first route guidance object and a left lane marking; and a third route guidance object indicated between a right side of the first route guidance object and a right lane marking.

6. The AR-based route guidance method of claim 5, further comprising:

when the vehicle leaves a lane marking, changing and displaying a display state of at least one of the second route guidance object and the third route guidance object.

7. The AR-based route guidance method of claim 1, wherein the route guidance object is displayed to move from the front to the rear when the vehicle is running forwards, and a movement speed of the route guidance object varies according to a speed of the vehicle.

8. The AR-based route guidance method of claim 1, further comprising:

when the vehicle approaches a turn point, displaying a turn point guidance object, without displaying the route guidance object.

9. A program stored in a computer-readable recording medium including a program code for performing the augmented reality (AR)-based route guidance method of claim 1.

10. A computer-readable recording medium storing a program for performing the augmented reality (AR)-based route guidance method of claim 1.

11. An electronic device for performing augmented reality (AR)-based route guidance, the electronic device comprising:

a display unit configured to display a screen;

a driving image acquiring unit configured to acquire a driving image captured by an image capturing device of a vehicle which is running;

a route data acquiring unit configured to acquire route data to a destination of the vehicle;

a lane marking recognizing unit configured to recognize both side lane markings of a lane in which the vehicle is running from the acquired driving image;

a route guidance linear data generating unit configured to generate first route guidance linear data based on the recognized the both side lane markings for a region in which the both side lane markings are recognized in the driving image, generate second route guidance linear data using link linear data of the route data for a region in which the both side lane markings are not recognized in the driving image, and generate a combined route guidance linear data by coupling the first route guidance linear data and the second route guidance linear data; and a controller configured to control the display unit to display a route guidance object on an AR image by determining a mapping position of the route guidance object based on the generated combined route guidance linear data, wherein the route guidance linear data generating unit generates the second route guidance linear data by detecting the link linear data corresponding to a region in which the both side lane markings are not recognized based on a current position of the vehicle among a plurality of link linear data and generates the second route guidance linear data based on the detected link linear data.

12. The electronic device of claim 11, wherein the route guidance object includes:

a first route guidance object having a center in the combined route guidance linear data and having an arrow shape indicating a route along which the vehicle is to run;

a second route guidance object indicated between a left side of the first route guidance object and a left lane marking; and a third route guidance object indicated between a right side of the first route guidance object and a right lane marking.

13. The electronic device of claim 12, wherein,
when the vehicle leaves a lane marking, the controller controls the display unit to change a display state of at least one of the second route guidance object and the third route guidance object and display the changed display state.

14. The electronic device of claim 11, wherein
the route guidance object is moved from the front to the rear and displayed in the AR image, and a movement speed of the route guidance object varies according to a speed of the vehicle.

15. The electronic device of claim 11, wherein
the controller controls the display unit to display a turn point guidance object, without displaying the route guidance object, when the vehicle approaches a turn point.

16. An augmented reality (AR) processing device comprising:
a driving image acquiring unit configured to acquire a driving image captured by an image capturing device of a vehicle which is running;
a route data acquiring unit configured to acquire route data to a destination of the vehicle;
a lane marking recognizing unit configured to recognize both side lane markings of a lane in which the vehicle is running from the acquired driving image;
a route guidance linear data generating unit configured to generate first route guidance linear data based on the recognized the both side lane markings for a region in which the both side lane markings are recognized in the driving image, generate second route guidance linear data using link linear data of the route data for a region in which the both side lane markings are not recognized in the driving image, and combine the first route guidance linear data and the second route guidance linear data to generate combined route guidance linear data; and
an AR image generating unit configured to generate an AR image by determining a mapping position of the route guidance object based on the generated combined route guidance linear data,
wherein the route guidance linear data generating unit generates the second route guidance linear data by detecting the link linear data corresponding to a region in which the both side lane markings are not recognized based on a current position of the vehicle among a plurality of link linear data and generates the second route guidance linear data based on the detected link linear data.

17. The AR processing device of claim 16, wherein
the route guidance linear data generating unit calculates a translation value of points constituting the link linear data based on a position of a first point constituting the first route guidance linear data and translates points constituting the link linear data based on the calculated translation value.

18. The AR processing device of claim 17, wherein
the route guidance linear data generating unit calculates a rotation angle of the link linear data based on a difference in angle between a driving direction vector of the vehicle and a route direction vector of the vehicle and rotates the link linear data according to translation based on the calculated rotation angle.

19. The AR processing device of claim 16, wherein,
when only one side lane marking is recognized in the driving image, the route guidance linear data generating unit generates a virtual lane marking for the other side lane marking based on lane marking width data.

* * * * *